(12) United States Patent
Leng et al.

(10) Patent No.: US 8,774,218 B2
(45) Date of Patent: Jul. 8, 2014

(54) FRAME CONSTRUCTING AND FRAME PROCESSING METHODS, DEVICE AND SYSTEM IN MULTI-HOP ACCESS NETWORK

(75) Inventors: Xiaobing Leng, Shanghai (CN); Kaibin Zhang, Shanghai (CN); Gang Shen, Shanghai (CN); Wei Zou, Shanghai (CN)

(73) Assignee: Alcatel Lucent, Paris (FR)

( * ) Notice: Subject to any disclaimer, the term of this patent is extended or adjusted under 35 U.S.C. 154(b) by 664 days.

(21) Appl. No.: 12/298,892

(22) PCT Filed: Apr. 27, 2007

(86) PCT No.: PCT/CN2007/001417
§ 371 (c)(1),
(2), (4) Date: Oct. 28, 2008

(87) PCT Pub. No.: WO2007/128218
PCT Pub. Date: Nov. 15, 2007

(65) Prior Publication Data
US 2009/0097434 A1  Apr. 16, 2009

(30) Foreign Application Priority Data
Apr. 29, 2006 (CN) .......................... 2006 1 0026263

(51) Int. Cl.
*H04J 3/24* (2006.01)
*H04W 88/04* (2009.01)

(52) U.S. Cl.
CPC .................................. *H04W 88/04* (2013.01)
USPC ........................................................ 370/474

(58) Field of Classification Search
CPC ............ H04W 80/04; H04W 72/0446; H04W 72/0426; H04L 2012/5652; H04L 29/0653
USPC ......... 370/310, 315, 316, 326, 328, 329, 330, 370/338, 431, 442, 443, 464, 474
See application file for complete search history.

(56) References Cited

U.S. PATENT DOCUMENTS

| 7,095,722 B1 | 8/2006 | Walke et al. |
| 7,466,985 B1 * | 12/2008 | Handforth et al. ............ 455/454 |

(Continued)

FOREIGN PATENT DOCUMENTS

| CN | 1377542 A | 10/2002 |
| CN | 1442961 A | 9/2003 |

(Continued)

OTHER PUBLICATIONS

International Search Report for International Application No. PCT/CN2007/001417.

(Continued)

*Primary Examiner* — Obaidul Huq
(74) *Attorney, Agent, or Firm* — Fay Sharpe LLP

(57) ABSTRACT

The present invention discloses a frame constructing method for use in a multi-hop wireless access network, the method comprising the steps of: determining Relay Stations (RSs) and Mobile Stations (MSs); setting a DL sub-frame; setting an UL sub-frame; and constructing a completed frame based on the UL sub-frame and the DL sub-frame; wherein the step of setting the DL sub-frame comprises a step of setting a DL relay sub-frame field for DL relay information sent to the RS; and the step of setting the UL sub-frame comprises a step of setting an UL relay sub-frame field for UL relay information sent from the RS. The present invention further discloses a corresponding frame processing method and a device, base station, relay station and system for implementing the method. According to the present invention, the synchronization in the whole network system is ensured, and the handover operation when the MS moves is simplified. Moreover, the situation that the base station and the relay stations use different frequencies can be supported. Additionally, the delay of traffic transmission is decreased.

58 Claims, 17 Drawing Sheets

(56) References Cited

U.S. PATENT DOCUMENTS

| | | |
|---|---|---|
| 2003/0165127 A1 | 9/2003 | Fujiwara et al. |
| 2005/0232183 A1* | 10/2005 | Sartori et al. ............... 370/319 |
| 2005/0272366 A1 | 12/2005 | Eichinger et al. |
| 2006/0046643 A1* | 3/2006 | Izumikawa et al. ............ 455/7 |
| 2007/0058577 A1* | 3/2007 | Rubin ........................... 370/328 |
| 2007/0060050 A1* | 3/2007 | Lee et al. ..................... 455/13.1 |
| 2007/0081502 A1* | 4/2007 | Lee et al. ..................... 370/337 |
| 2008/0070582 A1* | 3/2008 | Cai ............................... 455/450 |
| 2008/0285500 A1* | 11/2008 | Zhang et al. ................. 370/315 |

FOREIGN PATENT DOCUMENTS

| | | |
|---|---|---|
| CN | 1663197 A | 8/2005 |
| DE | 199 50 005 A1 | 4/2001 |
| DE | 101 45 759 A1 | 4/2003 |
| KR | 2005-0107044 | 11/2005 |

OTHER PUBLICATIONS

Supplemental European Search Report dated May 14, 2013 for Appl. No. EP 07 72 0990.

* cited by examiner

FRAME CONSTRUCTING AND FRAME PROCESSING METHODS, DEVICE AND SYSTEM IN MULTI-HOP ACCESS NETWORK

FIELD OF THE INVENTION

The present invention relates to the broadband wireless access network, and in particular, to a frame constructing method and a frame processing method, and a device, a base station, a Relay Station (RS) and a system for implementing the methods in the broadband wireless access network having multi-hop RSs.

BACKGROUND OF THE INVENTION

The Institute of Electrical and Electronics Engineers (IEEE) has proposed a series of standards for the field of wireless access technology applications, such as IEEE 802.11 for wireless local area networks and IEEE 802.15 for implementing short-range interconnections based on the Bluetooth specification. Currently, IEEE 802.16 being developed is a standard for air interfaces in IEEE wireless metropolitan area networks, and as a core technology of broadband wireless accesses it is attracting more attention. Especially, the IEEE 802.16j specification concerning multi-hop relays are attracting lots of attention from industry.

A plurality of features will be added to an original wireless access network, such as a synchronization operation among a Base Station (BS), a Relay Station (RS) and a Mobile Station (MS), since the IEEE 802.16j is intended to introduce RSs to relay signals between BSs and MSs. To cope with this situation, it is necessary to reconstruct corresponding frame structures so as to support multi-hop relays, thereby enhancing coverage, throughput and system capacity. Meanwhile, it is preferred that the constructed frames are transparent to MSs.

A lot of frame constructing methods based on the IEEE 802.16j frame have been developed. An example is a frame constructing method developed by Motorola Corporation, and the frame structure being constructed according to the method is as shown in FIG. 1. With the solution, it is needed to determine the RSs and MSs in direct communication with a BS firstly, which are called "direct-communication stations". Preamble 1 and broadcast information associated with these "direct-communication stations" and data sent to these direct-communication stations are set in a DL sub-frame 101 as a field 1011. Thereafter, it is needed to determine MSs communicating with the BS via RSs, which are called "relay-MS", and Preamble 2 and broadcast information associated with these "relay-MS" and DL data are set in the DL sub-frame 101 as another field 1012. For a UL sub-frame 102, it is needed to sequentially determine MSs and RSs which send data to the BSs. Then, respective preamble and UL data of a MS are set in the UL sub-frame 102 as fields 1021, 1022 and 1023 in the sequence of a MS communicating with the BS directly, then a MS communicating with a RS, and then a RS. Finally, the DL sub-frame 101 and UL sub-frame 102 are combined into a completed frame. According to the solution, the communication between a RS and a MS is kept through maintaining the specific field 1012 in the frame.

It can be seen from FIG. 1 that with respect to the preamble for implementing synchronization, the preamble 1 of the MS communicating with the BS directly is different from the preamble 2 of the MS communicating with the RS. Thus, a complex switching process would be performed when a MS moves between a RS's coverage domain and a BS coverage domain. As a result, this solution is not transparent enough for MSs.

In addition, with the solution, a BS and a RS send preambles at different time, respectively, frustrating the MS's synchronization operation.

Another frame constructing method is provided by Huawei company, and the frame structure being constructed according to the method is as shown in FIG. 2. Likewise, it is needed to determine RSs and MSs in direct communication with a BS firstly according to the method. What is different is that preamble A, broadcast information, DL data and UL data which are associated with these "direct-communication station" are then set in a sub-frame A together according to the method. Then, it is needed to determine MSs communicating with RSs, and preamble B, DL data and UL data which are associated with these "relay-MSs" are set in a sub-frame B, following the sub-frame A. The sub-frame A in the joint-frame constructed according to the method is in charge of relaying between BSs and RSs, while the sub-frame B takes charge of cell coverage. In the solution, there is included in each sub-frame (sub-frame A or B) both DL data and UL data. The communication between a BS and a RS is implemented through transfer of UL and DL data of which positions are fixed in the sub-frame.

It can be seen from fixed frame structure shown in FIG. 2 that transfers of UL and DL data between a BS and a RS are processed first, and then transfers of UL and DL data between the RS and a MS are processed. Thus, in the case of the UL communication of data from the MS to the BS via the RS, the MS is unable to send UL data (processed with the sub-frame B) to the RS when the data between the BS and the RS is being processed (by using the sub-frame A), and thus the data of MS can not be transferred in time, resulting in long delays. Frame structures of RSs #1 and #2 correspond to the frame structure of the BS are shown in FIG. 2, and their respective frame header is synchronized with the frame of the BS, and further it is necessary to obtain MAP information from the BS.

Moreover, this solution requires extra frequency planning and complex handover operation when a MS moves, if BSs with a RS are deployed adjacent to general BSs. This is because that the joint frame may not be aligned with a general frame, which will cause interference. This solution may also result in MS resynchronization when crossing different cells.

SUMMARY OF THE INVENTION

To address above problems, an object of the present invention is to provide a frame constructing method in a multi-hop wireless access network, comprising the steps of: determining Relay Stations (RSs) and Mobile Stations (MSs) in the Base Station (BS) domain; setting a DL sub-frame; setting an UL sub-frame; and constructing one frame based on the UL sub-frame and the DL sub-frame; wherein the step of setting the DL sub-frame comprises a step of setting a DL relay sub-frame field for DL relay information sent to the RS; and the step of setting the UL sub-frame comprises a step of setting an UL relay sub-frame field for UL relay information sent out from the RS.

A corresponding frame processing method for processing the frame constructed according to the above method for structuring a frame, comprises the step of: receiving a frame to be processed; extracting a DL sub-frame to analyze and process; and extracting an UL sub-frame to analyze and process; wherein the step of extracting the DL sub-frame to analyze and process comprises a step of extracting a DL relay sub-frame field in the DL sub-frame, to acquire DL relay information sent to the RS; and the step of extracting the UL sub-frame to analyze and process comprises a step of extracting an UL relay sub-frame field in the UL sub-frame to acquire UL relay information sent out from the RS.

To implement the above frame constructing method, the present invention further provides a frame constructing device in a multi-hop wireless access network, comprising: a determination means for determining Relay Stations (RSs) and Mobile Stations (MSs); a DL sub-frame generating means for generating a DL sub-frame; an UL sub-frame generating means for generating an UL sub-frame; and a combining means for constructing one frame based on the UL sub-frame and the DL sub-frame, wherein the DL sub-frame generating means comprises a DL relay sub-frame field setting means for setting a DL relay sub-frame field for DL relay information sent to the RS; and wherein the UL sub-frame generating means comprises an UL relay sub-frame field setting means for setting an UL relay sub-frame field for UL relay information sent from the RS.

To implement the frame processing method, the present invention provides a frame processing device in a multi-hop wireless data access network, comprising: a frame receiving means for receiving a frame to be processed; a DL sub-frame processing means for generating a DL sub-frame; and an UL sub-frame processing means for generating an UL sub-frame; wherein the DL sub-frame processing means comprises a DL relay sub-frame field processing means for extracting a DL relay sub-frame field in the DL sub-frame, to acquire DL relay information sent to the RS; and the UL sub-frame processing means comprises an UL relay sub-frame field processing means for extracting an UL relay sub-frame field in the UL sub-frame to acquire UL relay information sent from the RS.

The present invention further provides a base station (BS) in a multi-hop wireless access network, comprising: a BS DL sub-frame generating means for generating a BS DL sub-frame; a BS UL sub-frame generating means for generating a BS UL sub-frame; and a BS combining means for constructing one frame based on the BS DL sub-frame and the BS UL sub-frame, wherein the BS DL sub-frame generating means comprises a BS DL relay sub-frame field setting means for setting a DL relay sub-frame field for DL relay information sent from the BS to the RS; and wherein the BS UL sub-frame generating means comprises a BS UL relay sub-frame field setting means for setting a BS UL relay sub-frame field for UL relay information received by the BS from the RS.

Additionally, the present invention further provides a relay station (RS) in a multi-hop wireless access network, comprising: a RS DL sub-frame generating means for generating a RS DL sub-frame; a RS UL sub-frame generating means for generating a RS UL sub-frame; and a RS combining means for constructing one frame based on the RS DL sub-frame and the RS UL sub-frame, wherein the RS DL sub-frame generating means comprises a RS DL sub-frame field setting means for setting the DL relay sub-frame field of the RS for the DL relay information received by the current RS and the successive RSs if the current RS has successive RSs depended on it, and setting the DL relay sub-frame field of the RS for the DL relay information received by the current RS if the current RS has no successive RSs depended on it; and wherein the RS UL sub-frame generating means comprises a RS UL sub-frame field setting means for setting the UL relay sub-frame field of the RS for the UL relay information received by the current RS and the successive RSs if the current RS has successive RSs depended on it, and setting the UL relay sub-frame field of the RS for the UL relay information received by the current RS if the current RS has no successive RSs depended on it.

Further, the present invention provides a base station (BS) in a multi-hop wireless access network, comprising: a receiving means for receiving a frame from a RS; a RS UL sub-frame processing means for processing a RS UL sub-frame in the received frame; wherein the RS UL sub-frame processing means comprises a RS UL relay sub-frame field processing means for extracting the UL relay sub-frame field of the RS to acquire the UL relay information sent by the current RS and the successive RSs if the current RS has successive RSs depended on it, and extracting the UL relay sub-frame field of the RS so as to acquire the UL relay information sent by the current RS if the current RS has no follow-up RSs depended on it.

Further, the present invention provides a relay station (RS) in a multi-hop wireless access network, comprising: a receiving means for receiving a frame from a BS; a BS DL sub-frame processing means for processing the BS DL sub-frame, wherein the BS DL sub-frame processing means comprises a BS DL relay sub-frame field processing means for extracting a BS DL relay sub-frame field, to acquire DL relay information sent from the BS to the RS.

Further, the present invention provides a relay station (RS) in a multi-hop wireless access network, comprising: a receiving means for receiving a frame from a previous hop RS; a RS DL sub-frame processing means for processing a DL sub-frame in a frame received from the previous hop RS, wherein the RS DL sub-frame processing means comprises a previous hop RS DL relay sub-frame field processing means for extracting a previous hop RS DL relay sub-frame field to acquire DL relay information sent from the previous hop RS to the RS.

Further, the present invention provides a relay station (S) in a multi-hop wireless access network, comprising: a receiving means for receiving a frame from a next hop RS; a RS UL sub-frame processing means for processing an UL sub-frame in a frame received from the next hop RS, wherein the RS UL sub-frame processing means comprises a next hop RS UL relay sub-frame field processing means for extracting a next hop RS UL relay sub-frame field, to acquire UL relay information sent from the next hop RS to the RS.

The present invention further provides a multi-hop wireless access network having the above frame constructing device and the frame processing device.

In accordance with the frame constructing methods, the frame processing method and the device and system for implementing these methods, all MSs in the BS domain can have an identical synchronization time point, which ensures the synchronization of the whole network system, and the handover operation when a MS moves is simplified. Moreover, besides the situation that BS and RSs have an identical frequency, the situation that the BS and RSs have different frequencies is supported. Additionally, the delay of traffic transmission is reduced.

Other advantages would be apparent from the description and drawings. The above features and the following features can be used separately or in any combinations. The embodiments are not exhaustive ones, but exemplary description of the present invention.

BRIEF DESCRIPTION ON THE DRAWINGS

The above aspects and advantages of embodiments of the present invention will become apparent through the detailed description with reference to drawings, in which.

DESCRIPTION OF THE PREFERRED EMBODIMENTS

Embodiments of the present invention will be described with reference to drawings below.

Figure 1:
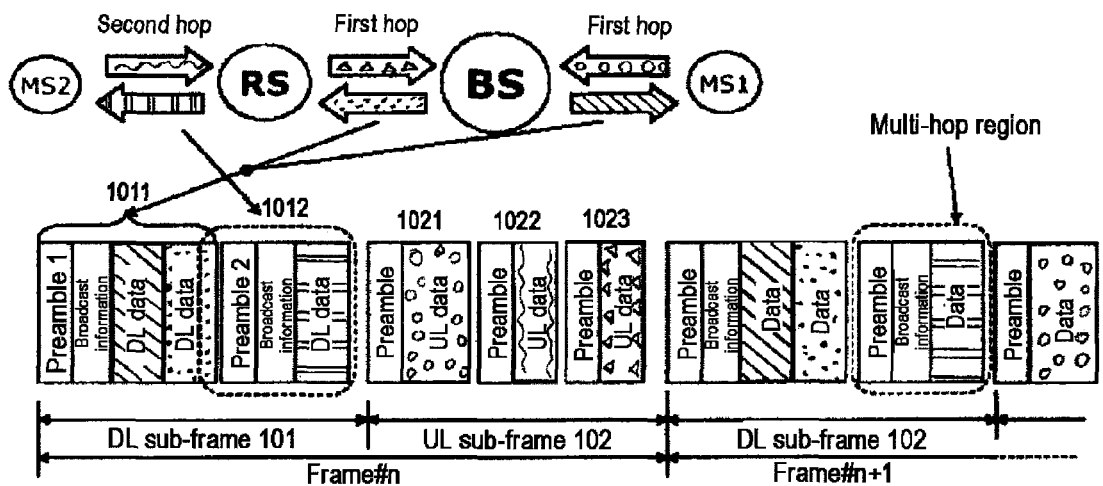
FIG. 1 shows a frame structure obtained by a frame constructing method in the prior art.
Figure 2:
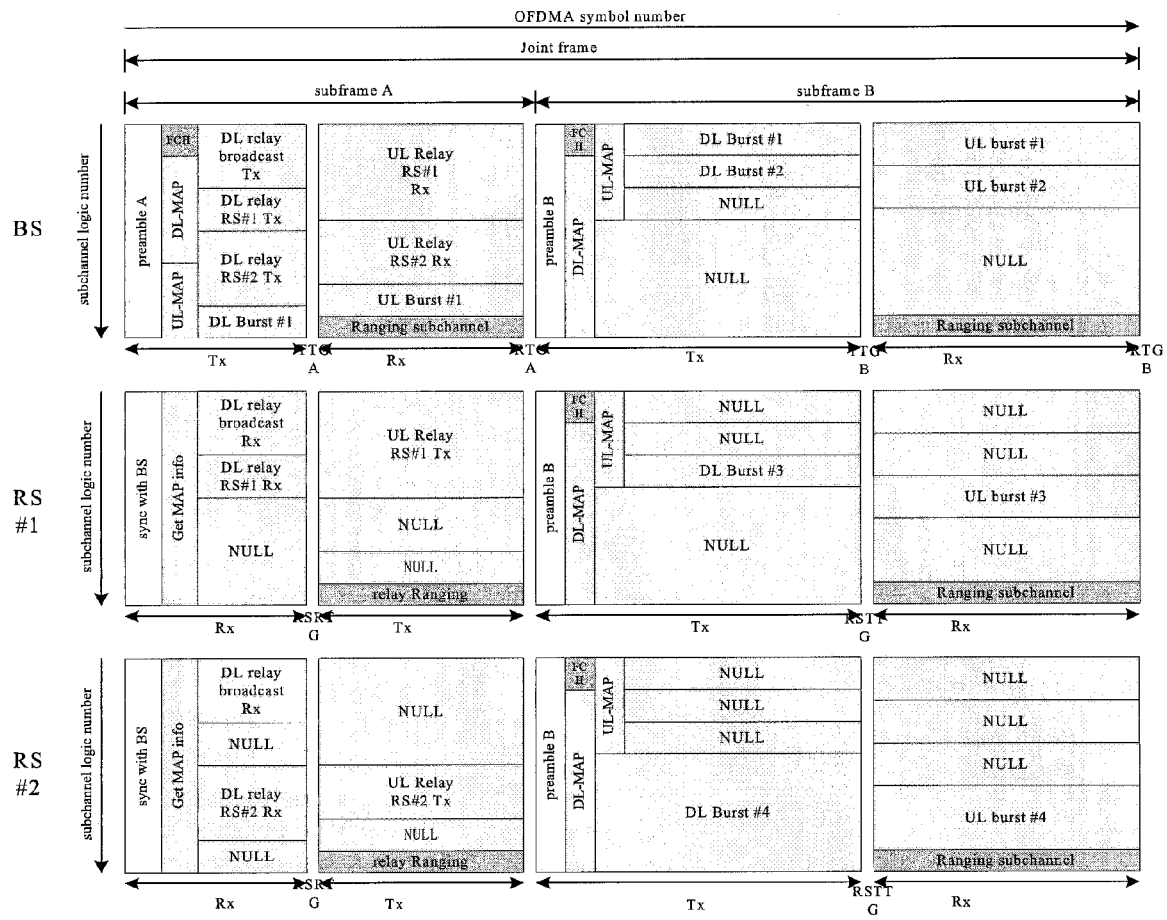
FIG. 2 shows a frame structure obtained by another frame constructing method in the prior art.
Figure 3:
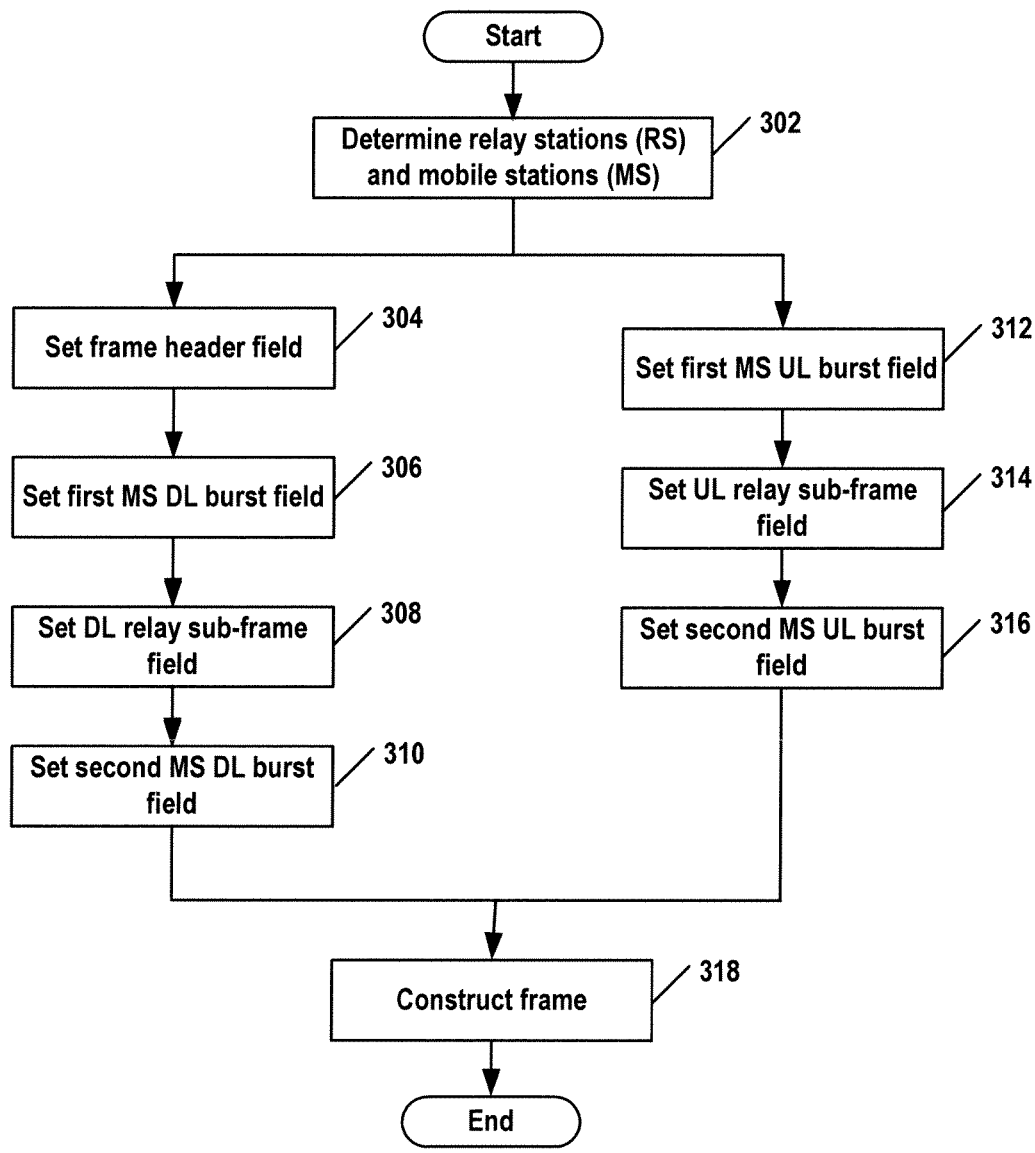
FIG. 3 shows a flow chart of a frame constructing method according to an embodiment of the present invention.

With respect to the characteristics of a system having multi-hop RSs, the flow chart of the frame constructing method according to one embodiment of the present invention is shown in FIG. 3. In step 302 of FIG. 3, RSs and MSs in the BS domain are determined by a pre-planning or pre-detecting. The UL and DL sub-frames are respectively set according to the determined situation, wherein a Frame Header (FH) field in the DL sub-frame is set in step 304. This field identifies the beginning of a valid frame. According to the 802.16 specification, the FH field includes three sub-fields in which preamble, Frame Control Header (FCH) and mapping (MAP) information are set respectively. The FCH controls the specific mappings in the MAP, and the MAP is used to notify RSs and MSs which are in communication with the BS of the time for sending or receiving data.

At the beginning of each frame, the BS and its all RSs will sent the above FHs at the same time. Thus, all MSs using the FHs sent by the BS or RSs can acquire identical synchronization time point. In the case of the BS and RSs having same frequencies, these FH are identical, and thus no interference will occur therebetween. For applications with identical frequencies, contents in the FHs of RSs are allocated by the BS in advance. The BS generally distributes the FH value to its all RSs through the DL relay sub-frame of the previous frame. However, if the BS and RSs have different frequencies respectively, the FHs of RSs can be different from the FH of the BS. In such case, there will be no interference therebetween as well.

Then, the flow shown in FIG. 3 proceeds to step 306. In step 306, DL data associated with those determined MSs in direct communication with the BSs are set as a first MS DL burst field, being a field of the DL sub-frame. Then, in step 308, a DL relay sub-frame field is set for the DL information sent to the determined RSs, being a single field in the DL sub-frame. A specific method for constructing the DL relay sub-frame field will be described with reference to FIG. 5.

Next, the flow shown in FIG. 3 proceeds to step 310. In step 310, DL data associated with those determined MSs communicating with RSs are set as a second MS DL burst field, being another separate field of the DL sub-frame. As such, the structure of the DL sub-frame is finished, which includes a FH field, the first MS DL burst field, the DL relay sub-frame field and the second MS DL burst field.

Figure 7:
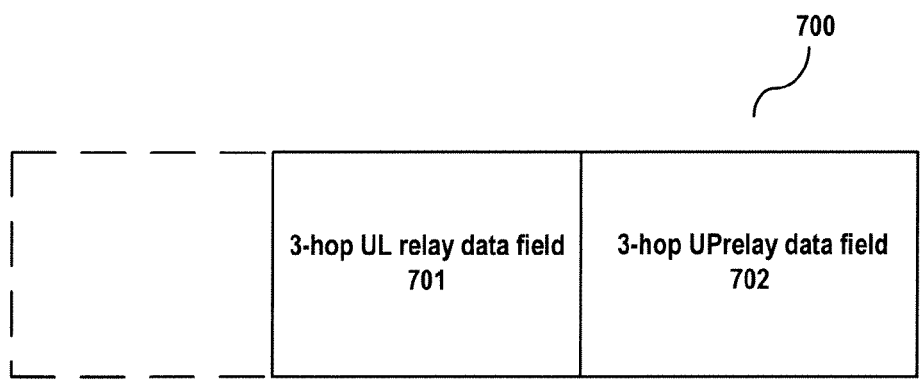
FIG. 7 shows a UL relay sub-frame field constructed according to an embodiment of the present invention.

Next, the constructing of UL sub-frame will be described. Similar to the method for constructing the DL sub-frame, in step 312, UL data of a MS communicating with a RS is set as a first MS UL burst field, being a field of the UL sub-frame. Then, in step 314, an UL relay sub-frame field is set for the UL information sent to the RS as a single field in the UL sub-frame. A specific method for constructing the UL relay sub-frame field will be described with reference to FIG. 7.

Next, the flow shown in FIG. 3 proceeds to step 316. In step 316, the UL data directly sent from those determined MSs to the BS is set as a second MS UL burst field, being another field of the UL sub-frame. As such, the constructing of the UL sub-frame is finished, which includes a first MS UL burst field, the UL relay sub-frame field and the second MS UL burst field.

Then, in step 318, the DL and UL sub-frames are combined so as to construct a completed frame. The flow shown in FIG. 3 ends.

Figure 4:
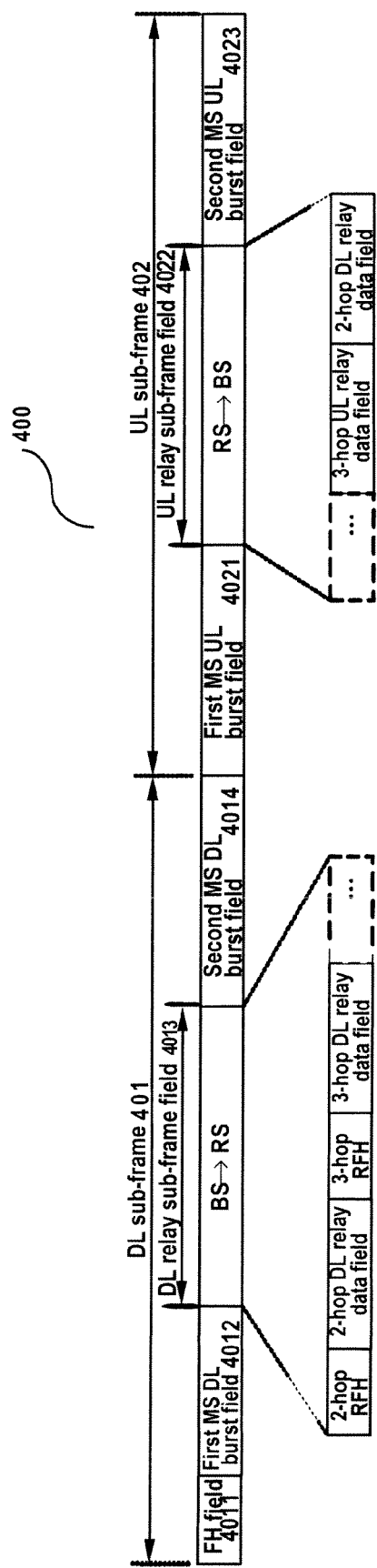
FIG. 4 is a schematic diagram of the frame structure being constructed using the frame constructing method according to an embodiment of the present invention.

The schematic diagram of the frame acquired by applying the frame constructing method shown in FIG. 3 is shown in FIG. 4. It can be seen from FIG. 4, a completed frame 400 comprises a DL sub-frame 401 and an UL sub-frame 402, and sizes of the two sub-frames and the positions of individual fields therein can be changed by the BS's scheduling according to, for example, the change of the number of RSs and MSs and the like. This enables device-manufactures to produce better system performance by optimizing operations of the scheduler in BS. The DL sub-frame 401 includes a FH field 4011, a first MS DL burst field 4012, a DL relay sub-frame field 4013 and a second MS DL burst field 4014. The UL sub-frame 402 includes a first MS UL burst field 4021, an UL relay sub-frame field 4022 and a second MS UL burst field 4023. The DL relay sub-frame field 4013 and the UL relay sub-frame field 4022 are specific sub-frame fields particularly defined for the communication between the BS and the RS. Besides these two specific sub-frame field, all other time slots in a frame are allocated to the MS for its use.

Figure 5:
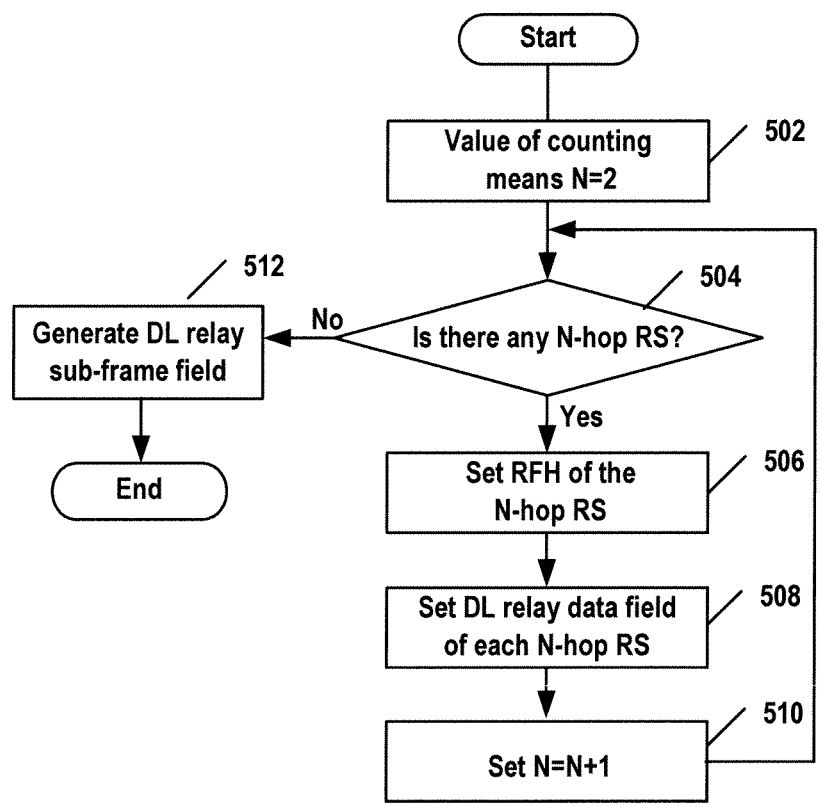
FIG. 5 shows a flow chart of a method for constructing a DL relay sub-frame field according to an embodiment of the present invention.

The specific constructing method of the above-mentioned DL relay sub-frame field 4013 is shown in FIG. 5, which is a detailed flow of the step 308 in FIG. 3. At first, a DL counting means value N is set as 2 in step 502. Next, it is determined whether there is any N-hop RS. If any, the flow goes to step 506 in FIG. 5. In step 506, a relay sub-frame header (RFH) of the N-hop RS is set, which identifies the beginning of the DL data sent to the N-hop RS. The RFH includes three parts, i.e., specific preamble, relay sub-frame control header and MAP messages (that is, various broadcast messages). In order to ensure that the frame constructed by the method according to the embodiment has a good transparency to MSs, the above-mentioned preamble can choose anyone of preamble sequences in the 802.16 specification which are not reserved for use by MSs. Thus, the specific preamble can only be recognized by RSs, and it is transparent for MSs. The preamble is used for synchronization between the RSs and BS, and it is different from the preamble in the above-mentioned frame header FH wherein the FH is used for synchronizing MSs.

It can be seen that with the frame constructing method according to the embodiments of the present invention, all MSs can acquire the same time point irrespective of whether the BS and RSs have an identical frequency, since MSs only use the preamble in the FH sent by the BS or RS at the same time to synchronize. Therefore, MSs across the BS domain and RS domain do not need to handle the complex handover operations.

Figure 6:
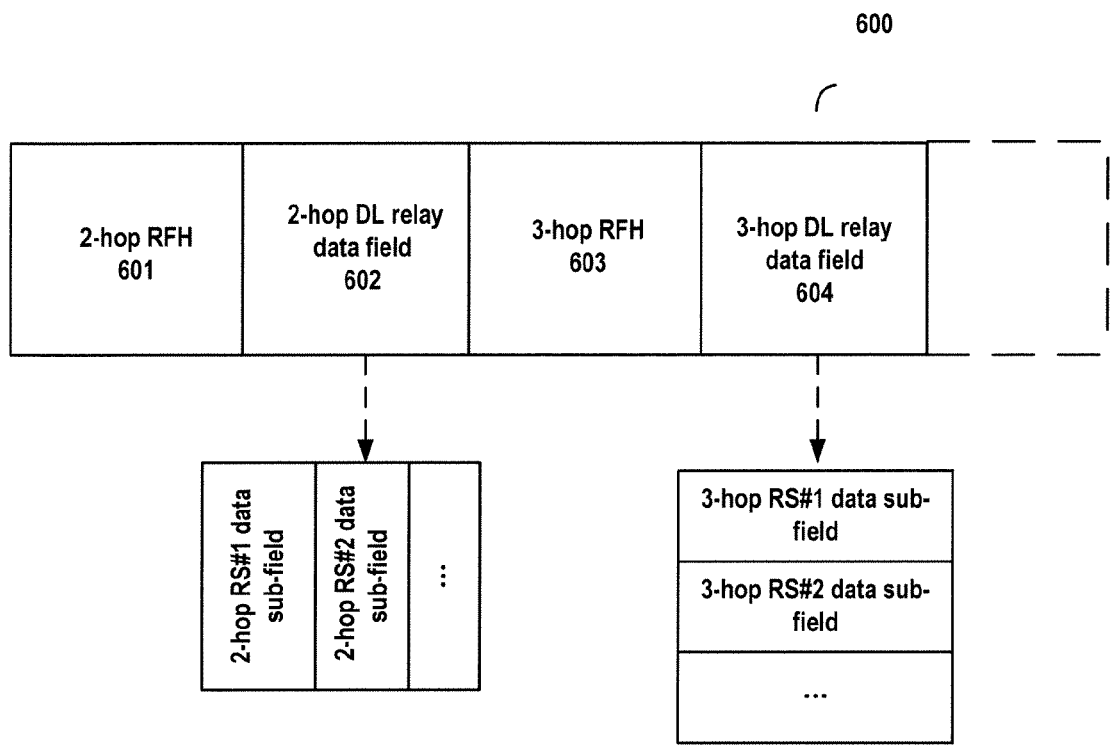
FIG. 6 is a schematic diagram of a DL relay sub-frame field constructed according to the constructing method of FIG. 5.

Then, the flow shown in FIG. 5 proceeds to step 508. In this step, the DL relay data sent to each N-hop RS is sequentially set as a sub-field of the DL relay data field, which corresponds to the each RS. Next, the flow proceeds to step 510, where the DL counting means value N is increased by 1 and then used as the new DL counting means value. Next, the flow returns to step 504 to re-determine. If it is determined in step 504 that there is any N-hop (now, N equals to the new value which has been increased by 1) RS, the above-mentioned steps 506 and 510 are repeated. The flow shown in FIG. 5 does not go to step 512 until there is no N-hop RS. In step 512, the DL relay sub-frame field is generated using the RFH and DL relay data field of respective N-hop RS. The flow shown in FIG. 5 ends. FIG. 6 is a schematic diagram of a DL relay sub-frame field constructed according to the structuring method of FIG. 5.

As shown in FIG. 6, a DL relay sub-frame field 600 sequentially includes a 2-hop RFH field 601, a 2-hop DL relay data field 602, a 3-hop RFH 603, a 3-hop DL relay data field 604 and the like. All RSs with identical number of hops share one RFH of which the contents are managed by the BS. Furthermore, it can be seen from FIG. 6 that in the DL relay sub-frame field, the RFH field and the DL relay data field are set in accordance with the ascending sequence of the number of hops of RSs, that is to say, the RFH and relay data related to a 2-hop RS are arranged first, and then those associated with a 3-hop RS are arranged, and so on. Such a frame constructing method is helpful for reducing the delay during the relay procedure, i.e., the DL data can be sent to the last MS through 2-hop RSs, 3-hop RSs and so on. Thus, the service quality of time-sensitive traffic is ensured.

Additionally, if there are multiple RSs in each hop, the relay data of each RS can be implemented in a time-division manner or the frequency-division manner which is easy to be anticipated by those skilled in the art. In FIG. 6, the relay data of the 2-hop RS is the schematic diagram of the data implemented in a time-division manner, i.e., allocated according to time slots, shown with a dashed line under the frame, wherein a first time slot is allocated to the first RS in 2-hop RSs, a second time slot is allocated to the second RS in the 2-hop RSs, and so on. The third hop is a schematic diagram of data implemented based on different sub-carriers, i.e., frequency division, wherein a first sub-carrier is allocated the first RS in 3-hop RSs, a second sub-carrier is allocated to the second RS in the 3-hop RSs, and so on. The embodiments of the present invention are described in the exemplary time-division manner.

Likewise, the UL relay sub-frame field is constructed by the method according to embodiments of the present invention, except that it is not necessary to set a RFH for RSs of each hop. This is because that the RFH of the DL relay sub-frame has already included information for controlling the UL and DL relay transmissions of the corresponding RS. Furthermore, when constructing the UL relay sub-frame field, the data fields of the RS is arranged in a descending sequence of hops, that is, the data of the RS being farthest from the BS (that is, the maximum value of the DL counting means reaches to −1 when the DL relay sub-frame is constructed) is arranged first, and the data of the 2-hop RS is arranged last. The UL relay sub-frame field obtained with the constructing method has the frame structure shown in FIG. 7. Such a frame constructing method is helpful for reducing the delay during the relay procedure, that is, the UL data can be transferred to the RS which is nearest to the BS in the sequence of from the RS farthest from the BS to the 2-hop RS.

Figure 8:
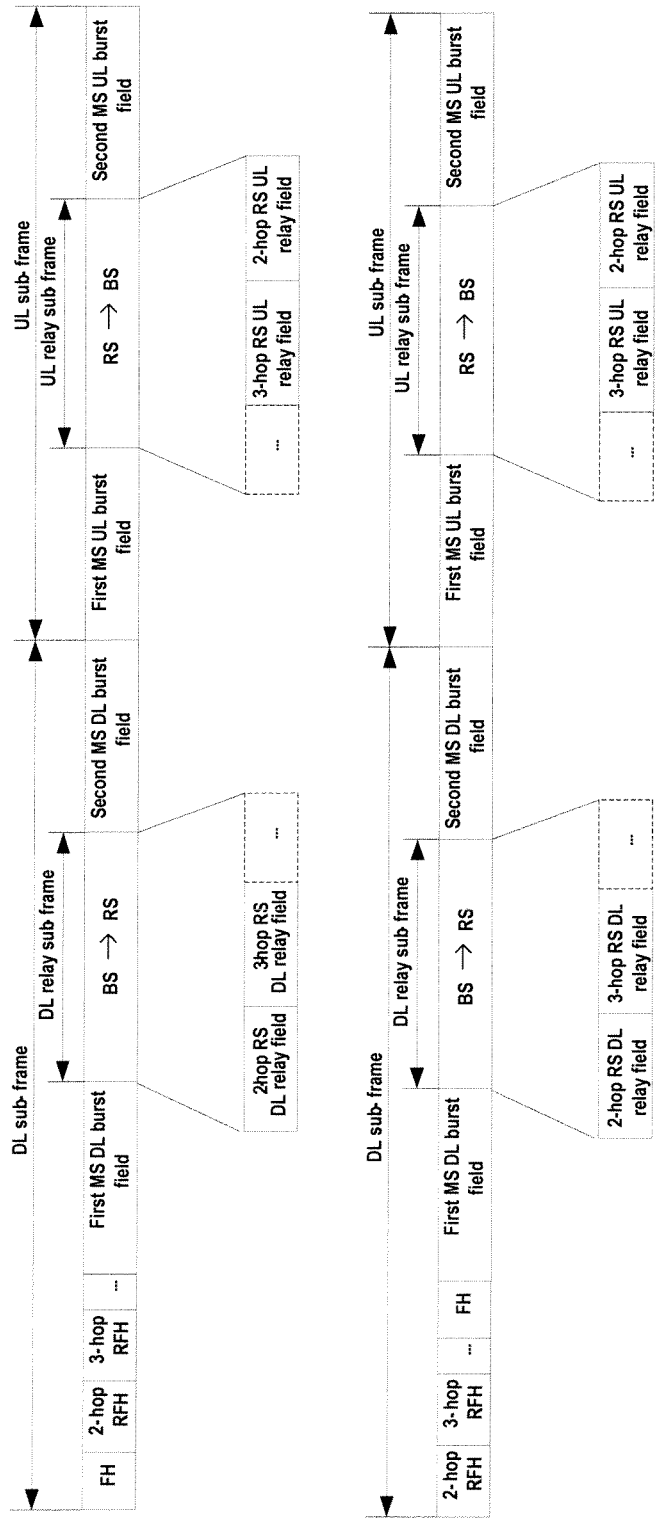
FIG. 8 shows two exemplary frame structures which are changed by altering the order of each acquired field.

It can be seen from the above-mentioned description that the frame structure obtained with the frame constructing method according to embodiments of the present invention is an improvement of the existing general 802.16 frame, and thus the general operation function for frames specified in the 802.16 specification can be utilized to the utmost extent, such as the scheduling function of the BS during the frame constructing procedure. For this, the BS can schedule each field when constructing a frame according to specific situations of the RSs and MSs in the BS coverage domain, thereby reordering the each field in the obtained frame. For example, the transmission of data between the BS and the MS or between the RS and the MS can be arranged in any available time slots, respectively. As another example, the RFH in the above-mentioned DL relay sub-frame field can be set in any position in the whole frame rather than the DL relay sub-frame field. As shown in the two examples in FIG. 8, the RFH corresponding to each hop can be separated from the DL relay sub-frame field, and can be set immediately after the FH or even before the FH.

Using such feature, the data to be transferred by the MS can be allocated so as to perform scheduling more effectively. For example, when the MS communicates via a RS, the receiving slots for the MS may be allocated after the DL relay sub-frame in the DL sub-frame as many as possible, and the sending slots for the MS may be allocated before the UL relay sub-frame in the UL sub-frame as many as possible. Generally, if a MS has a plurality of types of services (for example, voice traffic sensitive to delay, data traffic insensitive to delay and the like), the traffic data sensitive to delay (for example, voice traffic) is set in the first MS UL burst field before the UL relay sub-frame field, and the traffic data insensitive to delay (for example, data traffic) is set in the second MS UL burst field after the UL relay sub-frame field. Such a frame constructing method can improve the delay characteristic of the data transmission, thereby improving service quality.

Understanding the scheduling the sequence of each field in the frame as described above, it is easy for those skilled in the art to perceive that the arrangement sequence of each field in the frame constructing method according to embodiments of the present invention can be scheduled by BS based on practical situations in the BS domain, and its specific sequence should not be used to limit the present invention.

Figure 9:
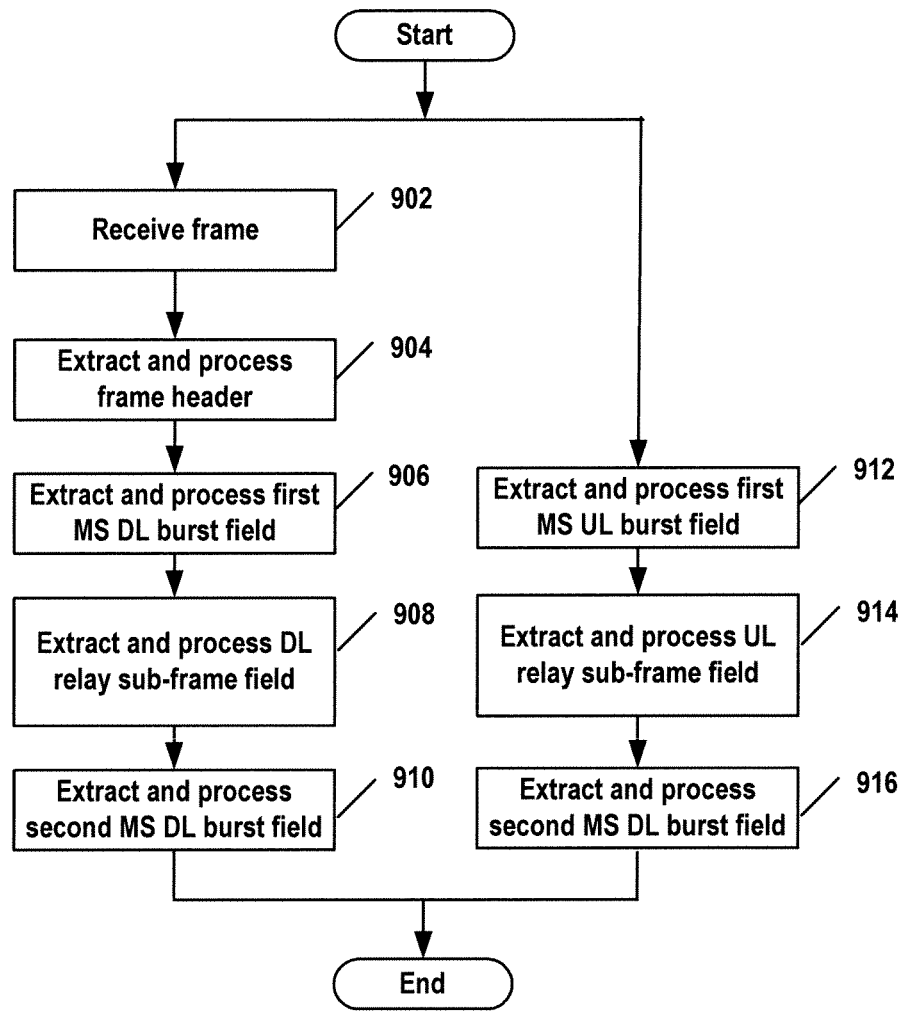
FIG. 9 shows a flow chart of frame processing method according to an embodiment of the present invention.

Corresponding to the frame constructing method according to the above-mentioned embodiments of the present invention, FIG. 9 shows the flow chart of the processing method performed by the receiving part of the frame formed according to the above-mentioned method. For clarity, the process on the frame shown in FIG. 4 is used as an example to describe. However, it should be understood that the frame processing method according to embodiments of the present invention is similar with that for the frame scheduled by the BS.

The frame processing method according to embodiments of the present invention shown in FIG. 9 receives a frame to be processed in step 902. Next, in step 904, the FH field, i.e., 4011 in FIG. 4, is extracted from the received frame. It is known from the FH field 4011 that the valid frame will be transferred, thereby deciding the synchronization point and preparing to receive and transmit data according to the MAP information. The processes on each successive field begin from step 906. In this step, the first MS DL burst field 4012 in the DL sub-frame 401 is extracted, from which related DL data directly sent from the BS to the MS is acquired. Next, the flow shown in FIG. 9 proceeds to step 908, where the DL relay sub-frame field 4013 is extracted to acquire the data sent from the BS to the RS. According to the data sent from the BS to the RS, in step 910, the method acquires the data sent from the RS to the MS by extracting the second MS DL burst field 4014, so as to implement, by the RS, the relay procedure of the DL data transmission from the BS to the MS.

The process for the UL sub-frame 402 is similar to the above-mentioned process, that is, in step 912, the first MS UL burst field 4021 in the UL sub-frame 402 is extracted to acquire the data sent from the MS to the RS. Next, the flow shown in FIG. 9 proceeds to step 914, where the UL relay sub-frame field 4022 is extracted to acquire the data sent from the RS to the BS. Next, in step 916, the second MS UL burst field 4022 is extracted to acquire the data sent from the MS to the BS, so as to implement, by the RS, the relay procedure of the UL data transmission from the MS to the BS.

Figure 10:
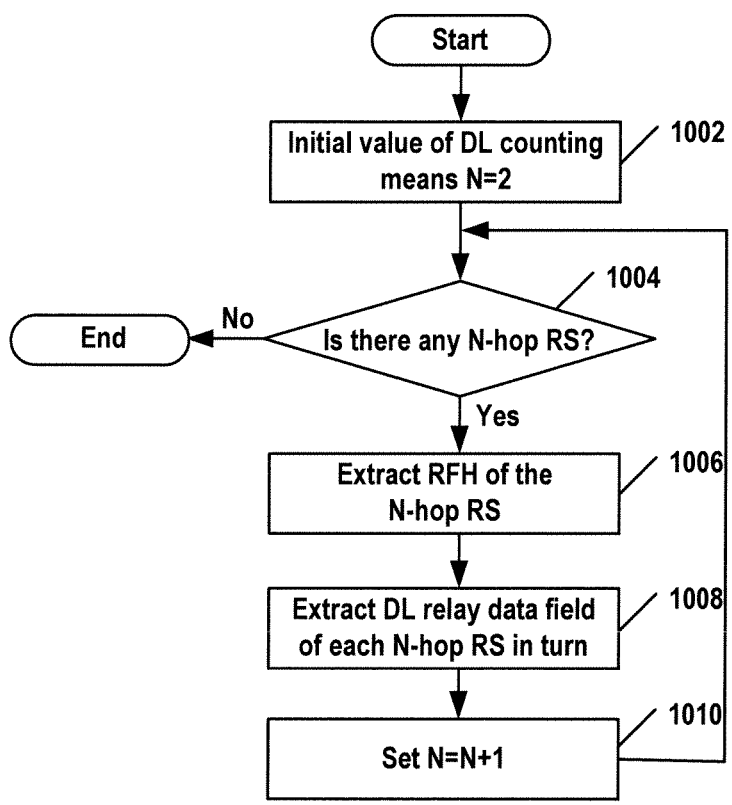
FIG. 10 shows a detailed flow chart of the steps of extracting and processing DL relay sub-frame field shown in FIG. 9.

The detailed flow of the step of extracting and processing the DL relay sub-frame field in FIG. 9 will be described with reference to FIG. 10. At first, the flow shown in FIG. 10 sets the DL counting means value N to 2 in step 1002. Next, it is determined whether there is any N-hop RS in step 1004. If any, the flow proceeds to step 1006 in FIG. 10. In step 1006, a RFH of the N-hop RS is extracted, which identifies the beginning of the DL data related to the N-hop RS. The RFH includes three parts, i.e., specific preamble, relay sub-frame control header and MAP messages. The specific preamble is transparent to MSs. Then, the flow shown in FIG. 10 proceeds to step 1008. In this step, respective DL relay data field of each N-hop RS is extracted in turn, to acquire the data sent to each RS. Next, the flow proceeds to step 1010 where the DL counting means value N is increased by 1 and then used as the new DL counting means value. Next, the flow returns to step 1004 to re-determine. If it is determined in step 1004 that there is any N-hop (now, N equals to the new value which has been increased by 1) RS, the above-mentioned steps 1006 and 1010 are repeated. The flow shown in FIG. 10 ends until it is determined in step 1004 that there is no N-hop RS.

Similarly, the method according to embodiments of the present invention can be used to process the UL relay sub-frame field, excepting that it is unnecessary to extract the relay FH since there is no RFH in the UL relay sub-frame field. Additionally, since the UL relay data field is arranged according to a descending sequence of hops when the UL relay sub-frame field is processed, the initial value of the UL counting means is the maximum value −1 to which the DL counting means reaches when the DL relay sub-frame field is processed, and the UL counting means decreases the value by 1 when each operation cycle ends.

Meanwhile, the present invention further provides a frame constructing device and a frame processing device for implementing the above-mentioned frame constructing and frame processing methods, respectively.

Figure 11:
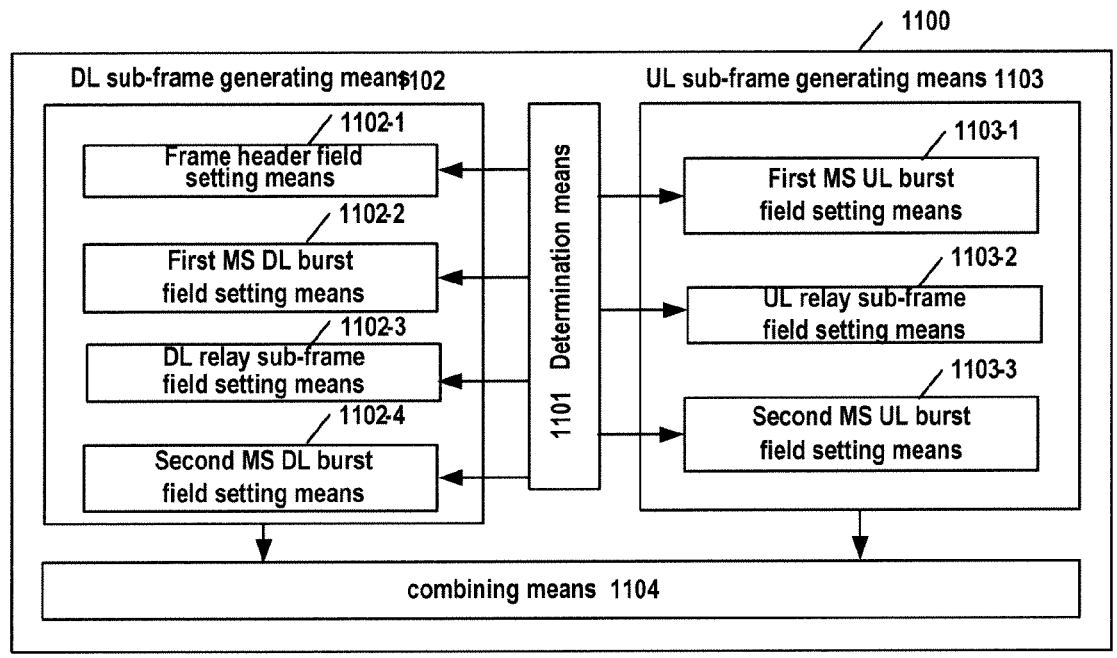
FIG. 11 is a schematic diagram of the structure of a frame constructing device according to an embodiment of the present invention.

The schematic diagram of the structure of a frame constructing device 1100 according to an embodiment of the present invention is shown in FIG. 11.

The frame constructing device 1100 includes a determination means 1101, a DL sub-frame generating means 1102, an UL sub-frame generating means 1103 and a combining means 1104.

As shown in FIG. 11, the determination means 1101 is used to determine the RSs and MSs in the BS domain, and send the determined result to the DL sub-frame generating means 1102 and the UL sub-frame generating means 1103, respectively, for generating DL and UL sub-frames.

The DL sub-frame generating means 1102 includes a FH field setting means 1102-1, a first MS DL burst field setting means 1102-2, a DL relay sub-frame field setting means 1102-3, and a second MS DL burst field setting means 1102-4. The FH field setting means 1102-1 identifies the beginning of a valid frame by setting the FH field. According to the 802.16 specification, a FH field includes three sub-fields in which preamble, Frame Control Header (FCH) and mapping (MAP) information are set respectively. The FCH controls specific mappings in the MAP, and the MAP is used to notify RSs and MSs in communication with the BS of the time for sending or receiving data.

The first MS DL burst field setting means 1102-2 sets DL data of those MSs in direct communication with the BS, determined by the determination means 1101, as a first MS DL burst field, being one field of the DL sub-frame. The DL relay sub-frame field setting means 1102-3 sets the DL relay sub-frame field, according to the information of the RSs determined by the determination means 1101, as a single field in the DL sub-frame. The second MS DL burst field setting means 1102-4 sets DL data of the MSs in communication with the RSs determined by the determination means 1101 as another single sub-field of the DL sub-frame.

The UL sub-frame generating means 1103 includes a first MS UL burst field setting means 1103-1, an UL relay sub-frame field setting means 1103-2 and a second MS UL burst field setting means 1103-3. The first MS UL burst field setting means 1103-1 sets UL data of the MSs in communication with the RS, determined by the determination means 1101, as the first MS UL burst filed, being one sub-field of the DL sub-frame. The UL relay sub-frame field setting means 1103-2 sets the UL relay sub-frame field according to the information of the RSs determined by the determination means 1101 as a single sub-field in the UL sub-frame. The detailed structure of the UL relay sub-frame setting means 1103-2 will be described with reference to FIG. 12. The second MS UL burst field setting means 1103-3 sets UL data of the MSs in direct communication with the BS determined by the determination means 1101 as another single sub-field of the UL sub-frame.

The combining means 1104 combines each field generated by the DL sub-frame generating means 1102 into a DL sub-frame, and combines each field generated by the UL sub-frame generating means 1103 into an UL sub-frame, and then combines the two sub-frame into a completed frame.

Hereinbefore, a brief description of the DL relay sub-frame field setting means 1102-3 in FIG. 11 is given, and its structure will be described in detail with reference to FIG. 12.

Figure 12:
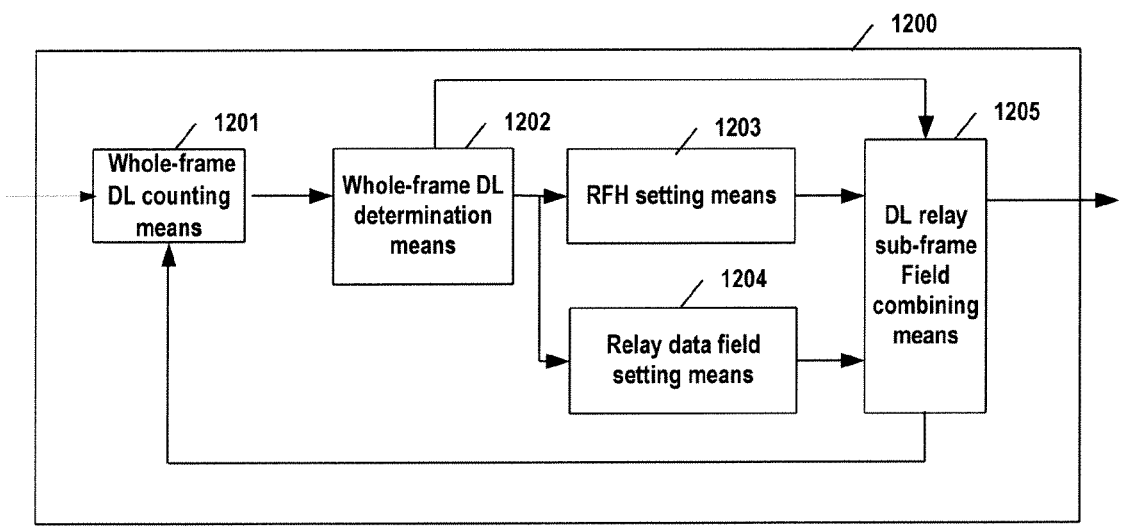
FIG. 12 is a schematic diagram of the structure of a DL relay sub-frame setting means shown in FIG. 11.

The DL relay sub-frame field setting means 1200 in FIG. 12 includes a whole-frame counting means 1201, a whole-frame determination means 1202, a RFH setting means 1203, a DL relay data field setting means 1204 and a DL relay sub-frame field combining means 1205.

The initial value of the whole-frame DL counting means 1201, N, equals to 2. According to the current value of the whole-frame DL counting means 1202, the whole-frame DL determination means 1202 determines whether there is any N-hop RSs. If any, the RFH setting means 1203 sets the RFH field of the N-hop RSs, and the DL relay data field setting means 1204 sets the DL relay data of each N-hop RS as one DL relay data sub-filed, respectively. The RFH setting means 1203 and the DL relay data field setting means 1204 sent the obtained results to the DL RFH combining means 1205. Upon receiving the results, the UL relay sub-frame field combining means 1205 sends a value increasing signal to the whole-frame DL counting means 1201. The value increasing signal makes the value N in the whole-frame DL counting means 1201 increased by 1. The whole-frame DL determination means 1202 re-determines according to the new N value. When the whole-frame DL determining means 1202 determines that there is any N-hop (now, the value of N is the new value increased by 1), the RFH means 1203, the relay data field setting means 1204 and the DL relay sub-frame field combining means 1205 repeat the above operations. The whole-frame DL determination means 1202 does not send a combining signal to the DL relay sub-frame field combining means 1205, until determining that there is no N-hop RS. The relay sub-frame field combining means 1205 uses the above set RFH field and DL data field of each hop to perform combination to generate a DL relay sub-frame field.

The inner structure of the UL relay sub-frame field setting means 1103-2 in FIG. 11 is generally equivalent with the structure of the DL relay sub-frame field setting means 1200, except that the RFH setting means is not necessary. This is because that the DL RFH of the DL relay sub-frame has included information for controlling the UL and DL relay transmissions of the corresponding RS. Additionally, since the UL relay data field is arranged according to a descending sequence of hops of RSs when the UL relay sub-frame field is constructed, the initial value of the whole-frame UL counting means is the maximum value −1 to which the whole-frame DL counting means reaches, and the signal sent from the UL relay sub-frame field combining means to the whole-frame UL counting means is also a value-decreasing signal. The whole-frame UL counting means decreases the value by 1 according to the signal each time.

After the frame constructed by the frame constructing device according to embodiments of the present invention is sent, the frame processing device at the receiving part receives and processes the frame correspondingly.

Figure 13:
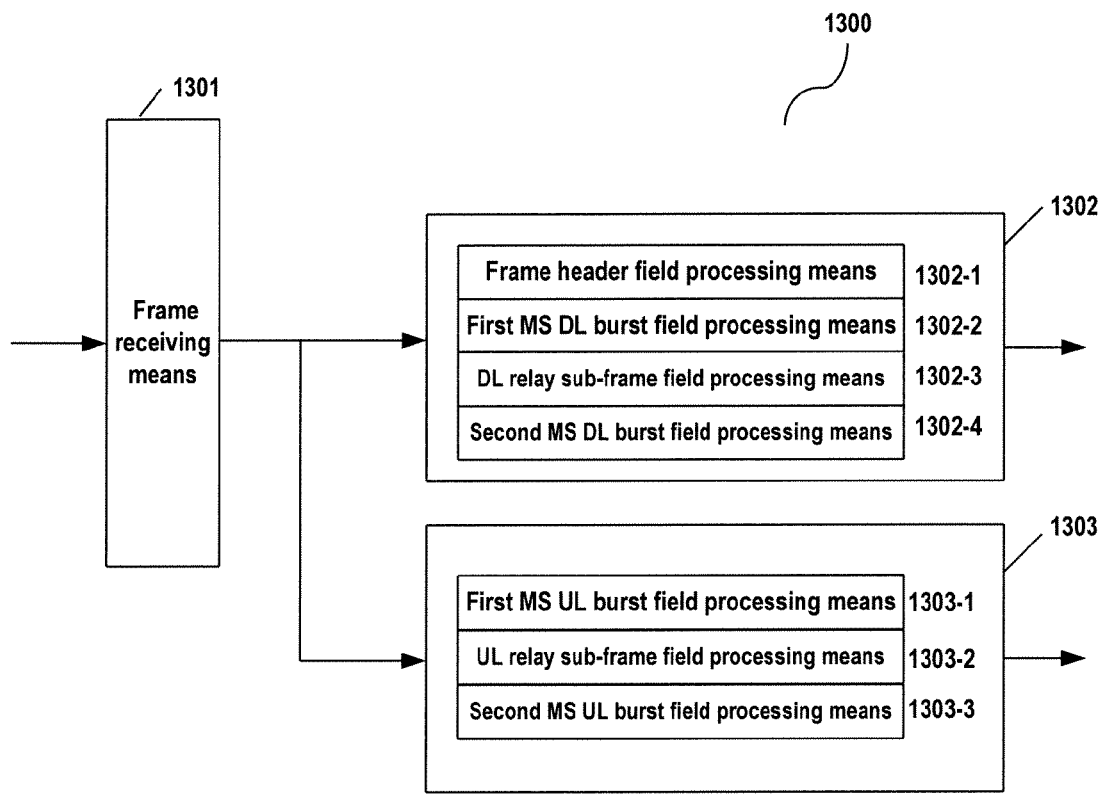
FIG. 13 is a schematic diagram of the structure of a frame processing device according to an embodiment of the present invention.

The schematic diagram of the structure of the frame processing device provided according to embodiments of the present invention is shown in FIG. 13. A frame processing device 1300 shown in FIG. 13 includes a frame receiving means 1301, a DL sub-frame processing means 1302 and an UL sub-frame processing means 1303. The UL sub-frame processing means 1302 includes a frame header field processing means 1302-1, a first MS DL burst field processing means 1302-2, a DL relay sub-frame field processing means 1302-3 and a second MS DL burst field processing means 1302-4. The UL sub-frame processing means 1303 includes a first MS UL burst field processing means 1303-1, an UL relay sub-frame field processing means 1303-2 and a second MS UL burst field processing means 1303-3.

The sent frame is received by the frame receiving means 1301. In the DL sub-frame processing means 1302, the frame header field processing means 1302-1 extracts the frame header field information so as to know that the valid frame is to be transferred, thereby determining the synchronization point, and preparing to receive and send data according to the MAP information. The first MS DL burst field processing means 1302-2 extracts the first MS DL burst field information in the DL sub-frame to acquire related DL data sent from the BS to the MS directly. The DL relay sub-frame field processing means 1302-3 extracts the DL relay sub-frame field information to acquire the RFH corresponding to each hop and the data to be sent to the RS. The second MS DL burst field processing means 1302-4 extracts the second MS DL burst field information to acquire the data sent from the BS to the MS.

The operations of the UL sub-frame processing means 1303 are similar with the above-mentioned operations. The first MS UL burst field processing means 1303-1 extracts the first MS UL burst field information to acquire the data sent from the MS to the RS. The UL relay sub-frame field processing means 1303-2 extracts the UL relay sub-frame field information to acquire the data sent from RSs of each hop to the BS. The second MS UL burst field processing means 1303-3 extracts the second MS UL burst field information to acquire the data sent from the MS to the BS.

Figure 14:
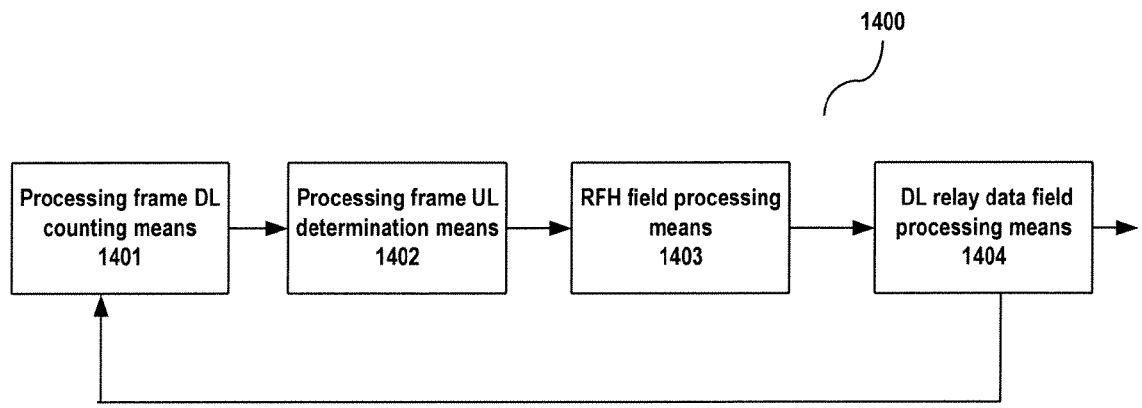
FIG. 14 is a schematic diagram of the structure of DL relay sub-frame processing means shown in FIG. 13.

The inner structure of the above-mentioned DL relay sub-frame field processing means will be described in detail with reference to FIG. 14. As shown in FIG. 14, a DL relay sub-frame field processing means 1400 includes a processing frame DL counting means 1401, a processing frame DL determination means 1402, a RFH processing means 1403 and a DL relay data field processing means 1404. The processing frame DL counting means 1401 is used to count during the processing of the DL relay sub-frame, and its initial value N is set as 2. According to the current value of the processing frame DL counting means 1401, the processing frame DL determination means 1402 determines whether there is any data related to N-hop RSs in the DL relay sub-frame. If any, the RFH field processing means 1403 is instructed to extract the RFH of the N-hop RS in the DL relay sub-frame to acquire the specific preamble, relay sub-frame control header and MAP information in the RFH. The specific preamble is used in the synchronization between the RS and BS. On the basis of the acquired preamble, relay sub-frame control header and MAP information, the DL relay data field processing means 1404 further extracts the DL relay data field corresponding to the respective N-hop RS, to acquire the DL relay data sent to respective N-hop RS sequentially. Next, a value increasing signal is sent to the processing frame DL counting means 1401 which increases the counting value N by 1 according to the signal. The processing frame DL determination means 1402 re-determines according to the new N value. If the processing frame DL determination means 1402 determines that there is related data of any N-hop (now, the value of N is the new value increased by 1) RS, each of the means 1403, 1404 and 1404 repeats the above-mentioned operations. The processing performed on the DL relay sub-frame field by DL relay sub-frame field processing means 1400 does not end until the processing frame DL determination means 1402 determines that there is no N-hop RS.

The inner structure of the UL relay sub-frame field processing means in FIG. 13 is generally equivalent with the inner structure of the above-mentioned DL relay sub-frame field processing means, except that there is no RFH processing means. Additionally, since the relay data field of the UL relay sub-frame field is arranged according to a descending sequence of hops, the initial value of the processing frame UL counting means is the maximum value −1 to which the processing frame DL counting means of the DL relay sub-frame processing means reaches, and the signal sent from the UL relay data field processing means to the processing frame UL counting means is a value decreasing signal. The processing frame UL counting means decreases the value by 1 according to the signal each time.

A multi-hop relay system according to embodiments of the present invention is composed of the BS, the RS and the MS having the above-mentioned frame constructing device and frame processing device. As described above, using the frame constructing method, the frame processing method, and the frame constructing device and the frame processing device for implementing such methods are used, the frequencies of the BS and the RS can be identical or not in the multi-hop relay system according to embodiments of the present invention. Inner operations of the multi-hop relay system according to embodiments of the present invention are further illustrated with three typical examples of the system.

Example 1

Figure 15:
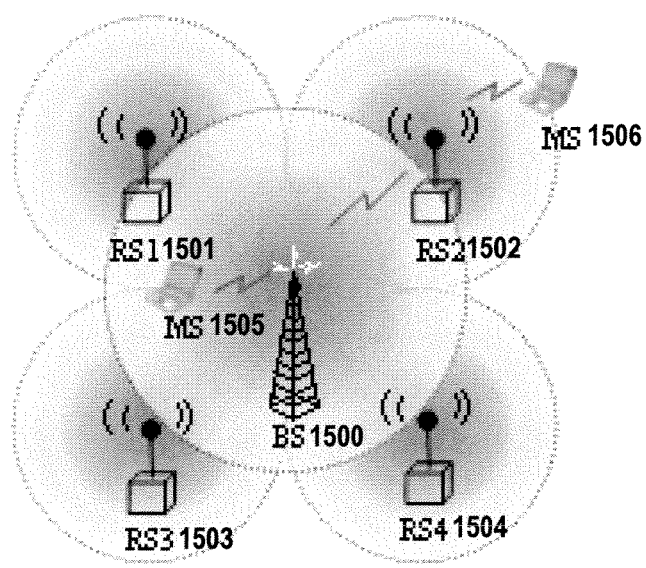
FIG. 15 is a schematic diagram of an exemplary 2-hop system with RSs and a BS having identical frequencies according to an embodiment of the present invention.

A 2-hop application system where the BS and RSs have the same frequencies, as shown in FIG. 15.

A BS 1500 shown in FIG. 15 has four RSs all of which have the same frequency, represented by 1501, 1502, 1503 and 1504 respectively. Additionally, the system has a MS 1505 in direct communication with the BS, and a MS 1506 communicating with the BS 1505 via the RS 1502.

Figure 16:
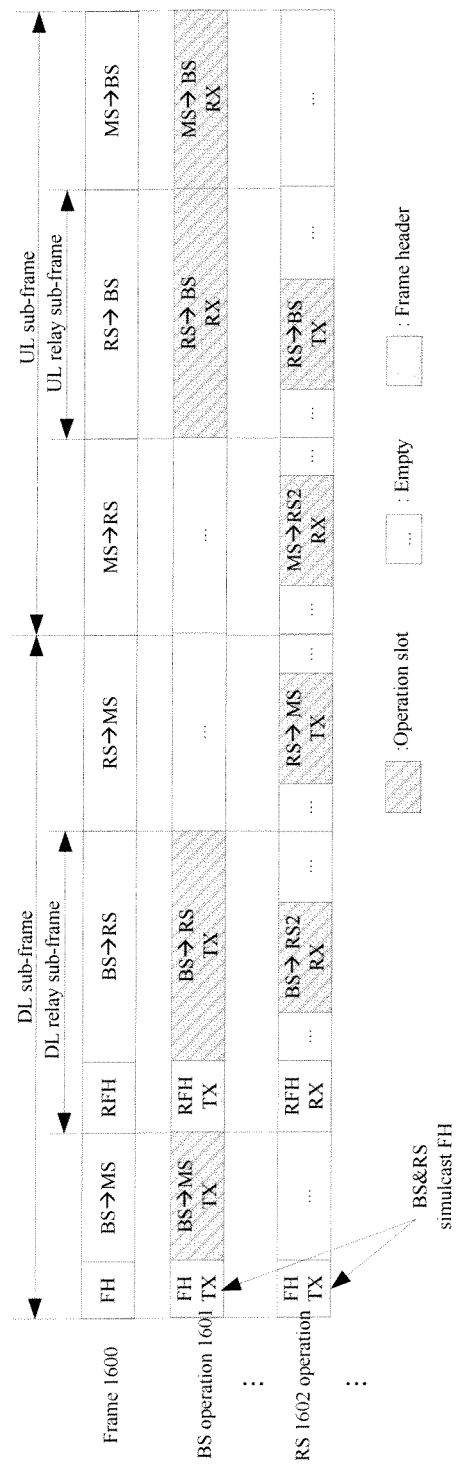
FIG. 16 shows a frame structure as a result of applying the frame constructing method according to an embodiment of the present invention in the system shown in FIG. 15.

For the application shown in FIG. 15, the frame constructing method according to embodiments of the present invention is applied to construct the frame for use in communication among the BS, RS and MS. For easy of illustration, the description is given with reference to FIG. 16 in which the frame structure is the result obtained by using the frame constructing method according to embodiments of the present invention in the exemplary system shown in FIG. 15. In FIG. 16, 1600 refers to a general frame structure used in the environment. The data content in each field is shown: 1601 refers to the frame structure constructed by the BS 1500; and 1602 refers to the frame structure structured by the RS 1502 in the BS 1500 domain.

For the BS 1500 in the example shown in FIG. 15, a FH 1601-1 of the frame used in the BS domain is constructed at first, and the FH is identified as to be sent. The FH is notified to all RSs 1501, 1502, 1503 and 1504 in advance, and these RSs all use the FH as the FH of their respective constructed frames. The frames with the same FH structured by the BS and RS will be sent at the same time. Thus, the FH is also referred to simulcast FH, for controlling operations of all MSs. Then, the data sent from the BS 1500 to the MS 1505 is set in the first MS DL burst field 1601-2. The following DL relay sub-frame field is shared by four RSs in the time-division or frequency-division manner. In the period of DL relay sub-frame, the RS uses the specific preamble in the RFH to synchronize with the BS, and works in the MS mode to receive data from the BS. Specifically, the RFH 1601-3 is set at first, in which the send of the data is identified. Then the data 1601-4 to be sent from the BS to the RS is set after the RFH. Since the data sent from the BS to the MS 1505 has been set in the 1601-2, the second MS DL burst field 1601-5 reserved for the data sent from the RS to the MS is set as null in the DL sub-frame. If the second MS DL burst field is not null, the RS will work in the BS mode in this period to sent data to the MS. When the UL sub-frame is set, since the first MS UL burst field has no relation with the BS, the field 1601-6 is set as null. Next, the data 1601-7 sent from the receiving RS to the BS, and then the receiving of the data sent from the MS 1505 to the BS is set as be the second MS UL burst field 1601-8.

Hereinafter, corresponding to the frame constructing method of the BS 1500, the second RS 1502 is used as an example to describe the frame constructing method adopted by the RS 1502. After receiving the FH 1601-1 sent from the BS 1500, the RS 1502 uses this FH as the FH of its own constructed frame as well. Since the RS 1502 does not relate to the transfer of data between the BS and the MS, the RS 1502 sets the first MS DL burst field 1602-1 in the DL sub-frame to be null. The DL relay sub-frame field is set next. The RFH 1602-2 is set at first, and to cooperate with the send of the BS 1500, the RS 1502 identifies the receiving of the data in the RFH correspondingly. The latter DL relay data part is set corresponding to the RS 1502, that is, the data sent from the receiving BS to the RS 1502 is set in 1602-3 to correspond to the send of the corresponding position 1601-4 in the frame constructed by the BS 1500, so as to receive the data sent from the BS 1500 within this time slot. Time slots for other RSs are set as null. To send the data received from the BS 1500 to the MS 1506 in communication with the RS 1502 in time, the RS 1502 set the data to be sent to the MS 1506 in the corresponding sub-field 1602-4 of the RS 1502 of the second MS DL burst field. Sub-fields for other RSs are set as null.

For the UL sub-frame, the data sent from the MS 1506 to the RS 1502 is set in the corresponding sub-field 1602-5 of the RS 1502 of the first MS UL burst field. Sub-fields for other RSs are set as null. Next, the data sent from the RS 1502 to the BS 1500 is set as the sub-field 1602-6 in the UL relay sub-frame corresponding to the RS 1502. This corresponds to the receiving in the UL relay sub-frame of the frame constructed by the BS 1500. Next, the RS 1502 sets the second MS UL burst field 1602-7 in the UL sub-frame to be null. Thus, the constructing of frames of the BS and RSs in the example shown in FIG. 15 is completed.

Since the BS 1500 and its all RSs in FIG. 15 work at an identical frequency, the time-division working manner can be used to schedule them. Of course, as for OFDMA, the scheduling can be implemented based on different sub-carries, that is, based on the frequency-division manner. Frame structures 1601 and 1602 in FIG. 16 can respectively reflect processing operations on the frame implemented by the BS 1500 and the RS 1502.

Hereinafter, the system of the present invention is illustrated with example two, and in the system, the BS and RSs work at different frequencies.

Figure 17:
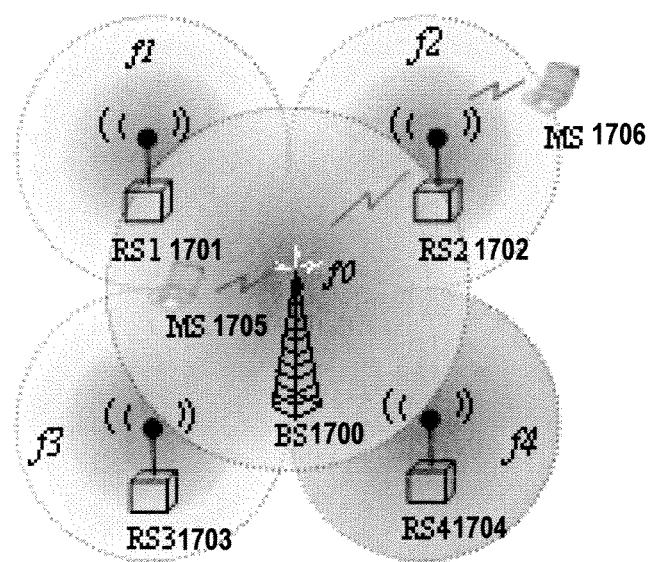
FIG. 17 is a schematic diagram of an exemplary 2-hop system with RSs and a BS having different frequencies according to an embodiment of the present invention.

Example 2 a 2-hop application system where the BS and RSs have different frequencies, as shown in FIG. 17.

A BS 1700 shown in FIG. 17 uses a frequency f0, and has four RSs 1701, 1702, 1703 and 1704, working at frequencies different from f0, represented as f1, f2, f3 and f4 respectively. Additionally, the system has a MS 1705 in direct communication with the BS and a MS 1706 communicating with the BS 1700 via the RS 1702.

Figure 18:
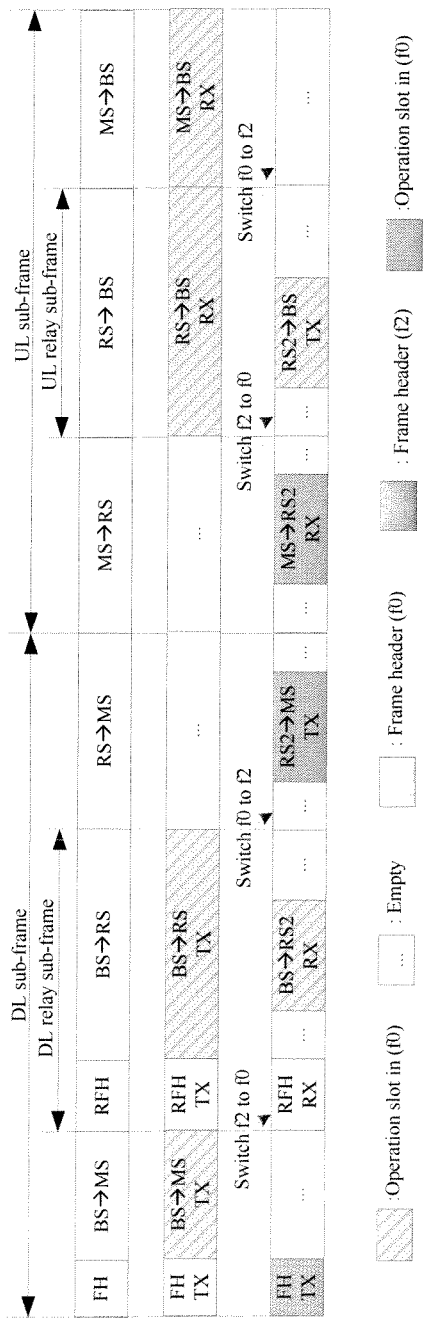
FIG. 18 shows a frame structure as a result of applying the frame constructing method according to an embodiment of the present invention in the system shown in FIG. 17.

For the example shown in FIG. 17, the frame constructing method according to embodiments of the present invention is used to construct the frame for use in communication among the BS, RS and MS. For easy of illustration, the description is given with reference to FIG. 18 of which the frame structure is the result obtained by using the frame constructing method according to embodiments of the present invention in the exemplary system shown in FIG. 17. In FIG. 18, 1800 refers to a general frame structure used in the environment. The data content in each field is shown: 1801 refers to the frame structure constructed by the BS 1700; and 1802 refers to the frame structure constructed by the RS 1702 in the BS 1700.

Since the BS 1700 and its four RSs in FIG. 17 have different frequencies, each RS can have its own FH, and these frames with different FH can be transferred in parallel in the system according to embodiments of the present invention. The RSs synchronize with the MSs in their domain using these FHs. Frame structures 1801 and 1802, acquired by the frame constructing method according to embodiments of the present invention shown in FIG. 18, can respectively reflect the processing operations on the frame by the BS 1700 and RS 1702. The frame constructing method 1801 and the frame constructing method 1601 in FIG. 16 are similar, and thus the description is omitted, and only the frame constructing method 1802 is described in detail.

The second RS 1702 uses its own FH as the frame header field 1802-1 of the frame 1802. Since the RS 1702 does not relate to the data transfer between the VS and the MS, the RS 1702 sets the first MS DL burst field 1802-2 in the DL sub-frame to be null. The DL relay sub-frame field is set next. Since the DL relay sub-frame field relates to the data transfer between the BS and RS, the RS needs to switch the frequency from f2 to f0 at first. The RS then works in the MS mode to receive data from the BS, and then sequentially sets the RFH 1802-3 and the receiving of the data sent from the BS to the RS 1702, and sets sub-fields for other RSs to be null, such that the relay operation is finished. As the data transfer from the RS 1702 to MS 1706 within its domain will be set, the RS needs to switch the frequency from f0 back to f2, and sets the data to be sent to the MS 1706 in the sub-field 1802-5 in the second MS DL burst field corresponding to the RS 1702. Sub-fields for other RSs are set to be null.

For the UL sub-frame, the data sent from the MS 1706 to the RS 1702 is set in the corresponding sub-field 1802-6 in the first MS UL burst field corresponding to the RS 1702. Sub-fields for other RSs are set to be null. Next, to set the data sent from the RS 1702 to the BS 1700, the RS needs to switch the frequency from f2 to f0 at first, and then set the data sent from the RS 1702 to the BS in the corresponding sub-field 1802-7, and set sub-fields of other RSs to be null. Next, the RS needs to switch the frequency from f0 back to f2, and then the second MS UL burst field 1802-8 in the UL sub-frame is set to be null. It can be seen from this that the RS is required to work at the frequency f0 when setting time slots related to relay (i.e., DL relay sub-frame field and UL relay sub-frame field), otherwise, it can work at its own frequency.

Hereinafter, the system of the present invention is illustrated with example three, and in the system, the BS has 3-hop RSs, and the BS and RSs work in identical frequencies.

Figure 19:
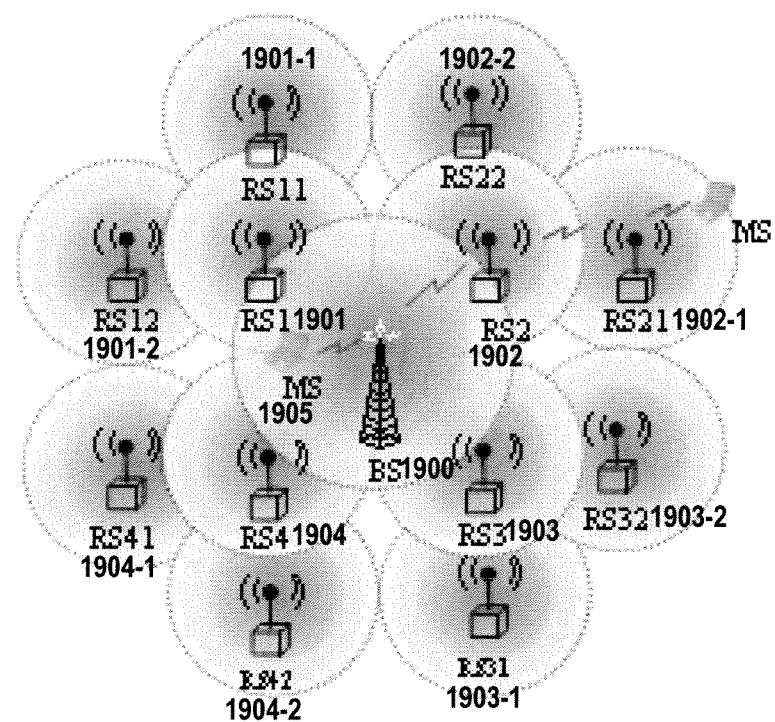
FIG. 19 is a schematic diagram of an exemplary 3-hop system with RSs and a BS having Identical frequencies according to an embodiment of the present invention.

Example 3 a 3-hop application system where the BS and RSs have same frequencies, as shown in FIG. 19.

A BS 1900 in the FIG. 19 has four 2-hop RSs with the same frequency as it, respectively referred to 1901, 1902, 1903 and 1904, and each RS having two next-hop RS respectively. Two next-hop RSs of the RS 1901 are 1901-1 and 1901-2; two next-hop RSs of the RS 1902 are 1902-1 and 1902-2; two next-hop RSs of the RS 1903 are 1903-1 and 1903-2; and two next-hop RSs of the RS 1902 are 1904-1 and 1904-2. These next-hop RSs constitute the eight 3-hop RSs of the system. Additionally, the system has a MS 1505 in direct communication with the BS and a MS 1906 communicating with the BS 1900 via the 3-hop RS 1902-1.

Figure 20:
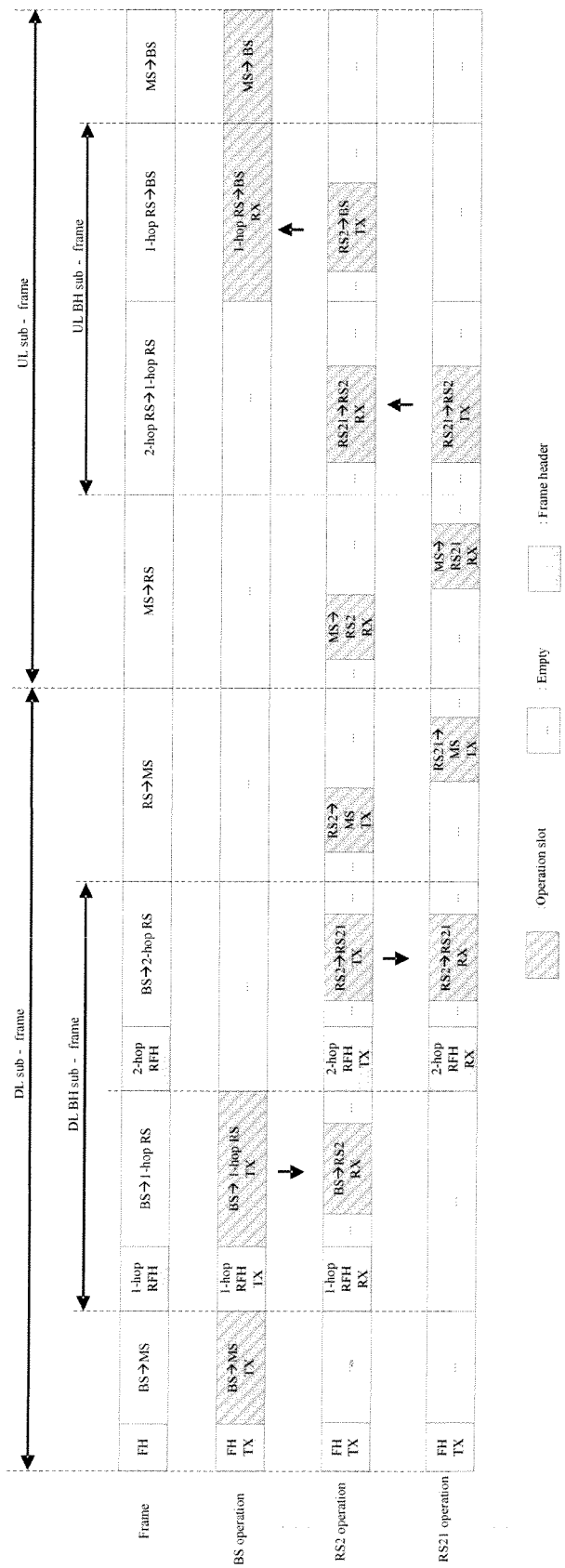
FIG. 20 shows a frame structure as a result of applying the frame constructing method according to an embodiment of the present invention in the system shown in FIG. 19.

For the example shown in FIG. 19, the frame constructing method according to embodiments of the present invention is used to construct the frame for use in communication among the BS, RS and MS. For easy of illustration, the description is given with reference to FIG. 20 of which the frame structure is the result obtained through the frame constructing method of FIG. 19. 2000 refers to a general frame structure used in the environment; 2001 refers to the frame structure constructed by the BS 1900; 2002 refers to the frame structure constructed by the RS 1902 of the BS 1900; and 2003 refers to the frame structured by the 3-hop RS 1902-1 of the BS 1900.

As shown by the general frame structure, the relay sub-frame field in the general frame structure includes two parts, i.e., the sub-fields corresponding to the 2-hop RS and the 3-hop RS. All 2-hop RSs use the 2-hop RFH, all 3-hop rSs use the 3-hop RFH. The 2-hop RFH can only be sent by the BS, while the 3-hop RFH can be sent by four 2-hop RSs at the same time. The 3-hop RFH is also managed by the BS broadcasting its value to all 2-hop RSs. The RFH sent by the BS and the RFH sent by the 2-hop RS have same preamble, however, this will not confuse the RSs, since each RS has known which RFH should be used at the system initialization phase, and thus will use information in the RFH to implement synchronization operation in the corresponding slots. As a result, 2-hop RFH and 3-hop RFH can have identical or different frame control and MAP information.

It can be seen from FIGS. 16 and 18 that what is different from the frame constructing method in the 2-hop system is that the data information of the 3-hop RS is added to the relay sub-frame when being constructed. For the BS 1900, when structuring a DL sub-frame, after the 2-hop RFH and 2-hop relay data are set, it is necessary to set the successive sub-fields corresponding to other-hop RFH and other-hop DL relay data to be null. For the RS 1902, when constructing a DL sub-frame, after the 2-hop relay sub-frame field 2002-3 and 2-hop DL relay data field 2002-4 are set, it is necessary to set the 3-hop RFH 2002-5 and the 3-hop DL relay data field 2002-6, wherein the 3-hop RFH 2002-5 is identified as to be sent, and the data sent from the 2-hop RS 1902 to the 3-hop RS 1902-1 is set as the 3-hop DL relay data field 2002-6. For the 3-hop RS 1902-1, when constructing the DL sub-frame, the 3-hop RFH 2003-4 in the DL relay sub-frame is identified as to be received, and the 3-hop DL relay data field 2003-5 is set as the receiving of the data sent from the 2-hop RS 1902 to the 3-hop RS 1902-1. Sub-fields for other RSs are set to be null.

The frame constructing method, the frame processing method and a device and system for implementing such methods according to the present invention have been described in detail with reference to figures. With these method and devices, all MSs in the domain of the BS in the multi-hop wireless access system according to embodiments of the present invention can have identical synchronization time point, which ensures the synchronization of the whole network system. Thus, when a MS moves across the domains of the BS and the RS, only a simple handover operation is required, and moreover, there is no interference between a general cell and relay cell. Furthermore, with the frame constructing method, the frame processing method and the device and system for implementing such methods according to embodiments of the present invention, not only the situation that the BS and RSs have an identical frequency is supported, but also the case of they having different frequencies is supported. This enables the method, device and system according to embodiments of the present invention to implement multi-hop backhaul application mode between BSs, that is, the backhaul traffic of one BS can be relayed by other BSs. Additionally, the frame arrangement which can be scheduled by the BS flexibly reduces the delay of traffic transmission, and the traffic delay will not be increased with the increase of hops.

What is claimed is:

1. A frame constructing method for use in a multi-hop wireless access network, comprising:
   determining Relay Stations (RSs) and Mobile Stations (MSs) in a Base Station (BS) domain;
   setting a Down Link (DL) sub-frame;
   setting an Up Link (UL) sub-frame; and
   constructing one frame based on the UL sub-frame and the DL sub-frame; and
   selecting a preamble not reserved for use by the MSs and configured to be used to synchronize the RSs with the BSs,
   wherein setting the DL sub-frame comprises: setting a frame header for synchronizing and controlling the MS, and setting a DL relay sub-frame field for DL relay information sent to the RS; and
   wherein setting the UL sub-frame comprises setting a UL relay sub-frame field for UL relay information sent from the RS;
   and wherein said DL sub-frame includes a relay sub-frame header, said relay sub-frame header including the preamble.

2. The method of claim 1, wherein setting the DL sub-frame comprises:
   setting DL data sent from the BS to the MS as a first MS DL burst field; and
   setting UL data sent from the RS to the MS as a second MS DL burst field.

3. The method of claim 1, wherein setting the UL sub-frame further comprises:
   setting UL data sent from the MS to the RS as a first MS UL burst field; and
   setting UL data sent from the MS to the BS as a second MS UL burst field.

4. The method of claim 1, wherein in setting the DL relay sub-frame field, a relay sub-frame header (RFH) field and a DL relay data field corresponding to respective RSs of respective hops are set in accordance with an ascending sequence of the hop numbers associated with the respective RSs.

5. The method of claim 4, wherein in setting the RFH, one RFH is set corresponding to respective hops of the respective RSs.

6. The method of claim 5, wherein in setting the DL relay data field, corresponding to the respective hop of the respective RS, the DL data sent to the respective RS of the respective hop is set as the DL relay data field.

7. The method of claim 6, wherein corresponding to each hop of the RS, data of each RS of this hop is set in a time-division or frequency-division manner.

8. The method of claim 5, wherein the RFH comprises a preamble not reserved for use by the MSs within the BS domain, and which is configured to be used to synchronize between the BS and the RS.

9. The method of claim 1, wherein in setting the UL relay sub-frame field, UL relay data fields corresponding to RSs of each hop are set in accordance with a descending sequence of the number of hops of the RSs.

10. The method of claim 9, wherein in setting the UL relay data field, corresponding to each hop of the RS, the UL data sent from the each RS of this hop is set as the UL relay data field of this hop.

11. A frame processing method for use in a multi-hop wireless data access network, the multi-hop wireless access network having Relay Stations (RSs) and Mobile Stations (MSs), and the frame processing method comprising:
    receiving a frame to be processed;
    extracting a Down Link (DL) sub-frame to analyze and process; and
    extracting an Up Link (UL) sub-frame to analyze and process;
    wherein the step of extracting the DL sub-frame to analyze and process comprises extracting a header field for synchronizing and controlling the MS, and extracting a DL relay sub-frame field in the DL sub-frame to acquire DL relay information sent to the RS; and
    extracting the UL sub-frame to analyze and process comprises a step of extracting an UL relay sub-frame field in the UL sub-frame to acquire UL relay information sent from the RS, and
    wherein extracting the UL sub-frame comprises extracting a UL relay sub-frame field for
        UL relay information sent from the RS;
        and wherein said DL sub-frame includes a relay sub-frame header, said relay sub-frame header including a preamble not reserved for use by the MSs within the Base Station (BS) domain and not reserved for use by the MSs within the relay stations domain that is within the BS domain, and is configured to be used to synchronize between the BS and the RS.

12. The method of claim 11, wherein extracting the DL sub-frame to analyze and process further comprises:
    extracting a first MS DL burst field to acquire DL data sent from the BS to the MS; and
    extracting a second MS DL burst field to acquire DL data sent from the RS to the MS.

13. The method of claim 11, wherein the step of extracting the UL sub-frame to analyze and process further comprises:
    extracting a first MS UL burst field to acquire UL data sent from the MS to the RS; and
    extracting a second MS UL burst field to acquire DL data sent from the MS to the BS.

14. The method of claim 11, wherein in extracting the DL relay sub-frame field, a relay sub-frame header (RFH) field and DL relay data field corresponding to respective RSs of respective hops are extracted in accordance with an ascending sequence of a respective hop number of the respective RSs.

15. The method of claim 14, wherein in extracting the RFH, corresponding to one of the respective RSs of a respective hop, one RFH is extracted.

16. The method of claim 15, wherein in extracting the DL relay data field, corresponding to one of the respective RS of a respective hop, the DL relay data field of the respective hop is extracted to acquire the DL data sent to the respective RS of the respective hop.

17. The method of claim 16, wherein corresponding to a respective hop of the respective RS, data of the respective RS is de-multiplexed in a respective time-division or frequency-division manner.

18. The method of claim 15, wherein the extracted RFH comprises a preamble not reserved for use by the MSs within the BS domain, and is used to synchronize between the BS and the RS.

19. The method of claim 11, wherein in extracting the UL relay sub-frame field, UL relay data field corresponding to respective RSs of respective hops is extracted in accordance with a descending sequence of the numbers of the respective hops of the respective RSs.

20. The method of claim 19, wherein in extracting the UL relay data field, corresponding to a respective hop of associated with the respective RS, the UL relay data field of the respective hop is extracted to acquire the UL data sent from the respective RS of the respective hop.

21. A frame constructing device for use in a multi-hop wireless access network comprising:
   a determiner that is operative to determine Relay Stations (RSs) and Mobile Stations (MSs) in a Base Station (BS) domain;
   a Down Link (DL) sub-frame generator that is operative to generate a DL sub-frame;
   an Up Link (UL) sub-frame generator that is operative to generate a UL sub-frame; and
   a combiner that is operative to construct one frame based on the UL sub-frame and the DL sub-frame,
wherein the DL sub-frame generator comprises a frame header field setter that is operative to set a frame header for synchronizing and controlling the MS, and a DL relay sub-frame field setter that is operative to set a DL relay sub-frame field for DL relay information sent to the RS; and
the UL sub-frame generator comprises an UL relay sub-frame field setter that is operative to set an UL relay sub-frame field for UL relay information sent from the RS; and
wherein the UL sub-frame generator sets the UL sub-frame by setting a UL relay sub-frame field for UL relay information sent from the RS;
and wherein said DL sub-frame includes a relay sub-frame header, said relay sub-frame header including a preamble not reserved for use by the MSs within the BS domain and is not reserved for use by the MSs within the relay stations domain that is within the BS domain, and is configured to be used to synchronize between the BS and the RS.

22. The device of claim 21, wherein the DL sub-frame generator further comprises:
   a first MS DL burst field setter that is operative to set DL data sent from the BS to the MS as a first MS DL burst field; and
   a second MS DL burst field setter that is operative to set DL data sent from the RS to the MS as a second MS DL burst field.

23. The device of claim 21, wherein the UL sub-frame generator means further comprises:
   a first MS UL burst field setter that is operative to set UL data sent from the MS to the RS as a first MS UL burst field; and
   a second MS UL burst field setter that is operative to set UL data sent from the MS to the BS as a second MS UL burst field.

24. The device of claim 21, wherein the DL relay sub-frame field setter comprises:
   a relay sub-frame header (RFH) field setter that is operative to set an relay sub-frame header field corresponding to RSs of each hop in accordance with an ascending sequence of the number of hops of the RSs; and
   a DL relay data field setter that is operative to set the DL relay data field corresponding to the RFH field of RSs of each hop.

25. The device of claim 24, wherein the RFH field setter is operative to set one RFH corresponding to each hop of the RSs.

26. The device of claim 25, wherein the DL relay data field setter is operative to set the DL data sent to a respective RS of a respective hop as the DL relay data field corresponding to the respective hop.

27. The device of claim 25, wherein the RFH comprises a preamble not reserved for use by the MSs within the BS domain, and is configured to be used to synchronize between the BS and the RS.

28. The device of claim 21, wherein the UL relay sub-frame field setter comprises:
   an UL relay data field setter that is operative to set a UL relay data field corresponding to respective RSs of respective hops in accordance with an ascending sequence of the hop numbers associated with the respective RSs.

29. The device of claim 28, wherein the UL relay data field setter is operative to set the UL data sent from a respective RS of a respective hop as the UL relay data field corresponding to the respective hop.

30. The device of claim 21, wherein data of a respective RS of a respective hop is set in a time-division or frequency-division manner.

31. A frame processing device for use in a multi-hop wireless data access network, the multi-hop wireless access network having Relay Stations (RSs) and Mobile Stations (MSs) in a Base Station (BS) domain, and the frame processing device comprising:
   a frame receiver that is operative to receive a frame to be processed;
   a Down Link (DL) sub-frame processor that is operative to generate a DL sub-frame; and
   an Up Link (UL) sub-frame processor that is operative to generate a UL sub-frame;
wherein the DL sub-frame processor comprises a frame header field processor that is operative to extract a frame header for synchronizing and controlling the MS, and a DL relay sub-frame field processor that is operative to extract a DL relay sub-frame field in the DL sub-frame to acquire DL relay information sent to the RS; and
the UL sub-frame processor comprises a UL relay sub-frame field processor that is operative to extract a UL relay sub-frame field in the UL sub-frame to acquire UL relay information sent from the RS, and
wherein extracting the UL sub-frame comprises extracting a UL relay sub-frame field for UL relay information sent from the RS;
and wherein said DL sub-frame includes a relay sub-frame header, said relay sub-frame header including a preamble not reserved for use by the MSs within the BS domain and not reserved for use by the MSs within the relay stations domain that is within the BS domain, and is configured to be used to synchronize between the BS and the RS.

32. The device of claim 31, wherein the DL sub-frame processing means comprises:
   a first MS DL burst field processor that is operative to extract a first MS DL burst field to acquire DL data sent from the BS to the MS; and
   a second MS DL burst field processor means for extracting a second MS DL burst field to acquire DL data sent from the RS to the MS.

33. The device of claim 31, wherein the UL sub-frame processor further comprises:
   a first MS UL burst field processor that is operative to extract a first MS UL burst field to acquire UL data sent from the MS to the RS; and
   a second MS UL burst field processor that is operative to extract a second MS UL burst field to acquire UL data sent from the MS to the BS.

34. The device of claim 31, wherein the DL relay sub-frame field processor comprises:
   a relay sub-frame header (RFH) field processor that is operative to extract a RFH field respectively corresponding to respective RSs of respective hops arranged in accordance with an ascending sequence of the numbers of the respective hops of the respective RSs;
   a DL relay data field processor that is operative to extract the DL relay data field corresponding to the respective RFH field of respective RSs of respective hops.

35. The device of claim 34, wherein the RFH field processing means is used to set one RFH corresponding to each hop of the RSs.

36. The device of claim 35, wherein the DL relay data field processor is operative to extract the DL relay data field of a respective hop to acquire the DL data sent to a respective RS of the respective hop.

37. The device of claim 35, wherein the RFH comprises a preamble not reserved for use by the MSs within the BS domain, and is configured to be used to synchronize between the BS and the RS.

38. The device of claim 31, wherein the UL relay sub-frame field processor comprises:
   an UL relay data field processor that is operative to extract an UL relay data field corresponding to respective RSs of respective hops arranged in accordance with a descending sequence of the numbers of respective hops of the respective RSs.

39. The device of claim 38, wherein the UL relay data field processor that is operative to extract respective UL relay data fields of respective hops to acquire the UL data sent from respective RSs of respective hops.

40. The device of claim 31, wherein data of respective RSs of respective hops are de-multiplexed in a respective time-division or frequency-division manner.

41. A base station (BS) in a multi-hop wireless access network, comprising:
   a BS Down Link (DL) sub-frame generator that is operative to generate a BS DL sub-frame;
   a BS Up Link (UL) sub-frame generator operative to generate a BS UL sub-frame; and
   a BS combiner that is operative to construct one frame based on the BS DL sub-frame and the BS UL sub-frame,
   wherein the BS DL sub-frame generator comprises a BS frame header field setter that is operative to set a frame header for synchronizing and controlling the Mobile Station (MS), and a BS DL relay sub-frame field setter that is operative to set a DL relay sub-frame field for DL relay information sent from the BS to the Relay Station (RS); and
   the BS UL sub-frame generating means comprises a BS UL relay sub-frame field setter that is operative to set a BS UL relay sub-frame field for UL relay information received from the RS; and
   wherein the BS UL sub-frame generator is operative to set the BS UL sub-frame by setting a BS UL relay sub-frame field for UL relay information sent from the RS;
   and wherein said BS DL sub-frame includes a relay sub-frame header, said relay sub-frame header including a preamble not reserved for use by the MSs within the BS domain and not reserved for use by the MSs within the relay stations domain that is within the BS domain, and is configured to be used to synchronize between the BS and the RS.

42. The BS of claim 41, wherein the BS DL sub-frame generating means further comprises:
   a BS first MS DL burst field setter that is operative to set a BS first MS DL burst field for the DL data sent from the BS to the MS; and
   a BS second MS DL burst field setter that is operative to set idle time slots as a BS second MS DL burst field.

43. The BS of claim 41, wherein the BS UL sub-frame generating means further comprises:
   a BS first MS UL burst field setter that is operative to set idle time slots as a BS first MS UL burst field; and
   a BS second MS UL burst field setter that is operative to set a BS second MS UL burst field for UL data received from the MS by the BS.

44. The BS of claim 41, wherein the BS DL sub-frame field setter means comprises:
   a BS relay sub-frame header (RFH) field setter that is operative to set a BS RFH field for a BS RFH corresponding to respective 2-hop RSs sent by the BS; and
   a BS DL relay data field setter that is operative to set a BS DL relay data field for DL data sent from the BS to a respective 2-hop RS, corresponding to the BS RFH field of the respective 2-hop RS.

45. The BS of claim 44, wherein the BS RFH comprises a preamble not reserved for use by the MSs within the BS domain, and is used to synchronize between the BS and the RS.

46. The BS of claim 41, wherein the BS UL sub-frame field setter comprises:
   a BS UL relay data field setter that is operative to set the BS UL relay data field for the UL data received by the BS from a 2-hop RS.

47. A relay station (RS) in a multi-hop wireless access network, comprising:
   a RS Down Link (DL) sub-frame generator that is operative to generate a RS DL sub-frame;
   a RS Up Link (UL) sub-frame generator that is operative to generate a RS UL sub-frame; and
   a RS combiner that is operative to construct one frame based on the RS DL sub-frame and the RS UL sub-frame,
   wherein the RS DL sub-frame generator means comprises a RS frame header field setter that is operative to set a frame header for synchronizing and controlling the Mobile Station (MS), and a RS DL relay sub-frame field setter that is operative to set the DL relay sub-frame field of the RS for the DL relay information received by the current RS and the successive RSs if the current RS has successive RSs depended on the current RS, and setting the DL relay sub-frame field of the RS for the DL relay information received by the current RS if the current RS has no successive RSs depended on it; and
   the RS UL sub-frame generator comprises a RS UL sub-frame field setter that is operative to set the UL relay sub-frame field of the RS for the UL relay information received by the current RS and the successive RSs if the current RS has successive RSs depended on the current RS, and setting the UL relay sub-frame field of the RS for the UL relay information received by the current RS if the current RS has no successive RSs depended on the current RS; and
   wherein said RS DL sub-frame includes a relay sub-frame header, said relay sub-frame header including a preamble not reserved for use by the MSs within the Base Station (BS) domain and not reserved for use by the MSs within the relay stations domain that is within the BS domain, and is configured to be used to synchronize between the BS and the RS.

48. The RS of claim 47, wherein the RS DL sub-frame generating means further comprises:
    a RS first MS DL burst field setter that is operative to set idle time slots as a RS first MS DL burst field; and
    a RS second MS DL burst field setter that is operative to set a RS second MS DL burst field for the DL data sent by the RS.

49. The RS of claim 47, wherein the RS UL sub-frame generator further comprises:
    a RS first MS UL burst field setter that is operative to set a RS first MS UL burst field for the UL data received by the RS; and
    a RS second MS UL burst field setter that is operative to set idle time slots as a RS second MS UL burst field.

50. The RS of claim 47, wherein the RS DL relay sub-frame field setter comprises:
    a RS relay sub-frame header (RFH) field setter that is operative to set RS RFH fields corresponding to the current RS and the successive RS in accordance with an ascending order of the number of hops if the current RS has successive RSs depended on it, and that is operative to set RS RFH fields corresponding to the current RS if the current RS has no successive RSs depended on it; and
    a RS DL relay data field setter that is operative to set RS DL relay data fields for the DL relay data received respectively by the current RS and the successive RS, corresponding to the RFH field of the RS.

51. The RS of claim 47, wherein the RS UL relay sub-frame field setter comprises:
    a RS UL relay data field setter that is operative to set UL relay data fields of the UL data sent by the current RS and the successive RSs depended on the RS respectively in accordance with a descending order of the number of the hops.

52. A base station (BS) in a multi-hop wireless access network, comprising:
    a frame constructing device including:
        a determiner that is operative to determine Relay Stations (RSs) and Mobile Stations (MSs) in the domain of the Base Station (BS);
        a Down Link (DL) sub-frame generator that is operative to generate a DL sub-frame;
        an Up Link (UL) sub-frame generator that is operative to generate a UL sub-frame; and
        a combiner that is operative to construct one frame based on the UL sub-frame and the DL sub-frame,
    wherein the DL sub-frame generator comprises a frame header field setter that is operative to set a frame header for synchronizing and controlling the MS, and a DL relay sub-frame field setter that is operative to set a DL relay sub-frame field for DL relay information sent to the RS; and
        the UL sub-frame generator comprises an UL relay sub-frame field setter that is operative to set an UL relay sub-frame field for UL relay information sent from the RS; and
        wherein the UL sub-frame generator sets the UL sub-frame by setting a UL relay sub-frame field for UL relay information sent from the RS; and
    wherein said DL sub-frame includes a relay sub-frame header, said relay sub-frame header including a preamble not reserved for use by the MSs within the BS domain and is not reserved for use by the MSs within the relay stations domain that is within the BS domain, and is configured to be used to synchronize between the BS and the RS:
    a frame processing device for use comprising:
        a frame receiver that is operative to receive a frame to be processed;
        a Down Link (DL) sub-frame processor that is operative to generate a DL sub-frame; and
        an Up Link (UL) sub-frame processor that is operative to generate a UL sub-frame;
    wherein the DL sub-frame processor comprises a frame header field processor that is operative to extract a frame header for synchronizing and controlling the MS, and a DL relay sub-frame field processor that is operative to extract a DL relay sub-frame field in the DL sub-frame to acquire DL relay information sent to the RS; and
        the UL sub-frame processor comprises a UL relay sub-frame field processor that is operative to extract a UL relay sub-frame field in the UL sub-frame to acquire UL relay information sent from the RS, and
        wherein extracting the UL sub-frame comprises extracting a UL relay sub-frame field for UL relay information sent from the RS; and
    wherein said DL sub-frame includes a relay sub-frame header, said relay sub-frame header including a preamble not reserved for use by the MSs within the BS domain and not reserved for use by the MSs within the relay stations domain that is within the BS domain, and is configured to be used to synchronize between the BS and the RS;
    a receiver that is operative to recieive a frame from a RS;
    a RS Up Link (UL) sub-frame processor that is operative to process a RS UL sub-frame in the received frame;
    wherein the RS UL sub-frame processor comprises a RS UL sub-frame field processor for extracting the UL relay sub-frame field of the RS to acquire the UL relay information sent by the current RS and the successive RSs if the current RS has successive RSs depended on the current RS, and for extracting the UL relay sub-frame field of the RS to acquire the UL relay information sent by the current RS if the current RS has no successive RSs depended on the current RS.

53. A relay station (RS) in a multi-hop wireless access network, comprising:
    a receiver that is operative to receive a frame from a Base Station (BS);
    a BS Down Link (DL) sub-frame processor that is operative to process the BS DL sub-frame,
    wherein the BS DL sub-frame processor comprises a BS DL relay sub-frame field processor that is operative to extract a BS DL relay sub-frame field to acquire DL relay information sent from the BS to the RS, and
    wherein said BS DL relay sub-frame includes a relay sub-frame header, said relay sub-frame header including a preamble not reserved for use by Mobile Stations (MSs) within a BS domain and not reserved for use by MSs within a relay station domain of said relay station that is within the BS domain, and is configured to be used to synchronize between the BS and the RS.

54. A relay station (RS) in a multi-hop wireless access network, comprising:
    a receiver that is operative to receive a frame from a previous hop RS;
    a RS Down Link (DL) sub-frame processor that is operative to process a DL sub-frame in a frame received from the previous hop RS, wherein the RS DL sub-frame processor comprises a previous hop RS DL relay sub-frame field processor that is operative to extract a previous hop RS DL relay sub-frame field to acquire DL relay information sent from the previous hop RS to the RS, and wherein said RS DL relay sub-frame includes a relay sub-frame header, said relay sub-frame header including a preamble not reserved for use by Mobile Stations (MSs) within a Base Station (BS) domain and not reserved for use by MSs within a relay station domain of said relay station that is within the BS domain, and is configured to be used to synchronize between the BS and the RS.

55. A relay station (RS) in a multi-hop wireless access network, comprising:

a frame constructing device including:

a determiner that is operative to determine Relay Stations (RSs) and Mobile Stations (MSs) in the domain of the Base Station (BS);

a Down Link (DL) sub-frame generator that is operative to generate a DL sub-frame;

an Up Link (UL) sub-frame generator that is operative to generate a UL sub-frame; and a combiner that is operative to construct one frame based on the UL sub-frame and the DL sub-frame, wherein the DL sub-frame generator comprises a frame header field setter that is operative to set a frame header for synchronizing and controlling the MS, and a DL relay sub-frame field setter that is operative to set a DL relay sub-frame field for DL relay information sent to the RS; and the UL sub-frame generator comprises an UL relay sub-frame field setter that is operative to set an UL relay sub-frame field for UL relay information sent from the RS; and wherein the UL sub-frame generator sets the UL sub-frame by setting a UL relay sub-frame field for UL relay information sent from the RS; and wherein said DL sub-frame includes a relay sub-frame header, said relay sub-frame header including a preamble not reserved for use by the MSs within the BS domain and is not reserved for use by the MSs within the relay stations domain that is within the BS domain, and is configured to be used to synchronize between the BS and the RS;

a frame processing device for use comprising:

a frame receiver that is operative to receive a frame to be processed;

a Down Link (DL) sub-frame processor that is operative to generate a DL sub-frame; and an Up Link (UL) sub-frame processor that is operative to generate a UL sub-frame;

wherein the DL sub-frame processor comprises a frame header field processor that is operative to extract a frame header for synchronizing and controlling the MS, and a DL relay sub-frame field processor that is operative to extract a DL relay sub-frame field in the DL sub-frame to acquire DL relay information sent to the RS; and the UL sub-frame processor comprises a UL relay sub-frame field processor that is operative to extract a UL relay sub-frame field in the UL sub-frame to acquire UL relay information sent from the RS, and wherein extracting the UL sub-frame comprises extracting a UL relay sub-frame field for UL relay information sent from the RS; and wherein said DL sub-frame includes a relay sub-frame header, said relay sub-frame header including a preamble not reserved for use by the MSs within the BS domain and not reserved for use by the MSs within the relay stations domain that is within the BS domain, and is configured to be used to synchronize between the BS and the RS;

a receiver that is operative to receive a frame from a next hop RS;

a RS Up Link (UL) sub-frame processor that is operative to process an UL sub-frame in a frame received from the next hop RS, wherein the RS UL sub-frame processor comprises a next hop RS UL relay sub-frame field processor that is operative to process a next hop RS UL relay sub-frame field to acquire UL relay information sent from the next hop RS to the RS.

56. A multi-hop wireless data access network, having Relay Stations (RSs) and Mobile Stations (MSs) in a Base Station (BS) domain, wherein the BS and RS respectively comprises the frame constructing device comprising a determiner that is operative to determine RSs and MSs in a BS domain, a DL sub-frame generator that is operative to generate a Down Link (DL) sub-frame, an Up Link (UL) sub-frame generator that is operative to generate an UL sub-frame, and a combiner that is operative to combine one frame based on the UL sub-frame and the DL sub-frame, wherein the DL sub-frame generator comprises a DL relay sub-frame field setter that is operative to set a DL relay sub-frame field for DL relay information sent to the RS, and the UL sub-frame generator comprises an UL relay sub-frame field setter that is operative to set an UL relay sub-frame field for UL relay information sent from the RS and the frame processing device comprising a frame receiver that is operative to receive a frame to be processed, a DL sub-frame processor that is operative to generate a DL sub-frame, and an UL sub-frame processor that is operative to generate an UL sub-frame, wherein the DL sub-frame processor comprises a DL relay sub-frame field processor that is operative to extract a DL relay sub-frame field in the DL sub-frame to acquire DL relay information sent to the RS, and the UL sub-frame processor comprises an UL relay sub-frame field processor means for extracting an UL relay sub-frame field in the UL sub-frame to acquire UL relay information sent from the RS.

57. The network of claim 56, wherein when the BS and the RS work at different frequencies, the RS needs to switch its own working frequency to the working frequency of the BS during setting the DL relay sub-frame and the UL relay sub-frame.

58. The network of claim 56, wherein the BS broadcasts the frame header to all RSs in the BS domain in advance as the frame header of the frame constructed by the BS and the RS.

* * * * *